United States Patent
Ejima

(10) Patent No.: US 7,855,751 B2
(45) Date of Patent: Dec. 21, 2010

(54) DATA TRANSMISSION DEVICE AND DATA RECEPTION DEVICE

(75) Inventor: Naoki Ejima, Hirakata (JP)

(73) Assignee: Panasonic Corporation, Osaka (JP)

( * ) Notice: Subject to any disclaimer, the term of this patent is extended or adjusted under 35 U.S.C. 154(b) by 2086 days.

(21) Appl. No.: 10/485,769

(22) PCT Filed: Jun. 12, 2003

(86) PCT No.: PCT/JP03/07462

§ 371 (c)(1),
(2), (4) Date: Feb. 4, 2004

(87) PCT Pub. No.: WO03/107667

PCT Pub. Date: Dec. 24, 2003

(65) Prior Publication Data
US 2004/0252235 A1 Dec. 16, 2004

(30) Foreign Application Priority Data
Jun. 12, 2002 (JP) ............................. 2002-171919

(51) Int. Cl.
H04N 7/12 (2006.01)
(52) U.S. Cl. .................. 348/423.1; 348/384.1
(58) Field of Classification Search ............. 348/384.1, 348/423.1; 375/240, 240.01, 240.28
See application file for complete search history.

(56) References Cited
U.S. PATENT DOCUMENTS
6,298,089 B1 * 10/2001 Gazit .................... 375/240.28

2004/0095509 A1 5/2004 Okamoto et al.

FOREIGN PATENT DOCUMENTS
JP 5-260012 10/1993
JP 7-38860 2/1995

(Continued)

OTHER PUBLICATIONS

Copending Application of Hidekazu Suzuki et al., U.S. Appl. No. 10/088,586, filed Jul. 9, 2002, entitled "Signal Transmitter and Signal Receiver".

(Continued)

Primary Examiner—Allen Wong
(74) Attorney, Agent, or Firm—Wenderoth, Lind & Ponack, L.L.P.

(57) ABSTRACT

As shown in FIG. 7, a data receiver receives video data and audio data together with a frequency division parameter N that depends on the pixel clock of the video data and the sampling frequency of the audio data, and a count value CTS that is obtained by counting the period of the audio clock that has been subjected to frequency division by the frequency division parameter N, with the pixel clock, which are transmitted from a data transmitter, and subjects the pixel clock to frequency division by the count value CTS, phase-control the divided clock (s501) in accordance with a phase comparison clock (s505) that is obtained by dividing an audio clock (s403) oscillated from a VCO (504) by the frequency division parameter N, thereby generating an audio clock (s403).

Accordingly, the data transmitter and the data receiver can satisfactorily implement multiplexing of audio data and video data, and transmission of the multiplexed data using an existing DVI cable, with a simple structure.

35 Claims, 29 Drawing Sheets

| FOREIGN PATENT DOCUMENTS | | |
|---|---|---|
| JP | 8-265657 | 10/1996 |
| JP | 9-179536 | 7/1997 |
| JP | 10-290378 | 10/1998 |
| JP | 11-317916 | 11/1999 |
| JP | 2002-125207 | 4/2002 |
| JP | 3718836 | 11/2005 |
| WO | 02/09443 | 1/2002 |
| WO | 02/32133 | 4/2002 |
| WO | 02/78336 | 10/2002 |
| WO | 02/078336 | 10/2002 |

OTHER PUBLICATIONS

Copending Application of Hiroshige Okamoto et al., U.S. Appl. No. 10/472,585, filed Sep. 22, 2003, entitled "Data Transmission Method, Data Receiving Method, Data Transmitter, and Data Receiver".

International Search Report issued Aug. 13, 2007 in the International (PCT) Application of which the present application is the U.S. National Stage.

*PanelLink A/V: The Digital Solution for HDTV*, Silicon Image, Feb. 2001, pp. 1-12.

* cited by examiner

Fig.8 (a)

| Pixel clock; 25.2/1.001MHz ||| 
|---|---|---|
| audio sampling frequency ||| 
| 32(kHz) ||| 
| N | CTS | frequency of phase comparison clock/ kHz |
| 4576 | 28125 | 0.895 |
| 9152 | 56250 | 0.448 |

Fig.8 (b)

| Pixel clock; 25.2/1.001MHz ||| 
|---|---|---|
| audio sampling frequency ||| 
| 44.1(kHz) ||| 
| N | CTS | frequency of phase comparison clock/ kHz |
| 7007 | 31250 | 0.806 |
| 14014 | 62500 | 0.403 |

Fig.8 (c)

| Pixel clock; 25.2/1.001MHz ||| 
|---|---|---|
| audio sampling frequency ||| 
| 48(kHz) ||| 
| N | CTS | frequency of phase comparison clock/ kHz |
| 2288 | 9375 | 2.685 |
| 4576 | 18750 | 1.343 |
| 6864 | 28125 | 0.895 |
| 9152 | 37500 | 0.671 |
| 11440 | 46875 | 0.537 |
| 13728 | 56250 | 0.448 |
| 16016 | 65625 | 0.384 |
| 18304 | 75000 | 0.336 |

Fig.9

| Pixel Clock;25.2 MHz | | | | | |
|---|---|---|---|---|---|
| audio sampling frequency | | | | | |
| 32(kHz) | | | | | |
| N | CTS | frequency of phase comparison clock/kHz | N | CTS | frequency of phase comparison clock/kHz |
| 1536 | 9450 | 2.667 | 8192 | 50400 | 0.500 |
| 1792 | 11025 | 2.286 | 8448 | 51975 | 0.485 |
| 2048 | 12600 | 2.000 | 8704 | 53550 | 0.471 |
| 2304 | 14175 | 1.778 | 8960 | 55125 | 0.457 |
| 2560 | 15750 | 1.600 | 9216 | 56700 | 0.444 |
| 2816 | 17325 | 1.455 | 9472 | 58275 | 0.432 |
| 3072 | 18900 | 1.333 | 9728 | 59850 | 0.421 |
| 3328 | 20475 | 1.231 | 9984 | 61425 | 0.410 |
| 3584 | 22050 | 1.143 | 10240 | 63000 | 0.400 |
| 3840 | 23625 | 1.067 | 10496 | 64575 | 0.390 |
| 4096 | 25200 | 1.000 | 10752 | 66150 | 0.381 |
| 4352 | 26775 | 0.941 | 11008 | 67725 | 0.372 |
| 4608 | 28350 | 0.889 | 11264 | 69300 | 0.364 |
| 4864 | 29925 | 0.842 | 11520 | 70875 | 0.356 |
| 5120 | 31500 | 0.800 | 11776 | 72450 | 0.348 |
| 5376 | 33075 | 0.762 | 12032 | 74025 | 0.340 |
| 5632 | 34650 | 0.727 | 12288 | 75600 | 0.333 |
| 5888 | 36225 | 0.696 | 12544 | 77175 | 0.327 |
| 6144 | 37800 | 0.667 | 12800 | 78750 | 0.320 |
| 6400 | 39375 | 0.640 | 13056 | 80325 | 0.314 |
| 6656 | 40950 | 0.615 | 13312 | 81900 | 0.308 |
| 6912 | 42525 | 0.593 | 13568 | 83475 | 0.302 |
| 7168 | 44100 | 0.571 | | | |
| 7424 | 45675 | 0.552 | | | |
| 7680 | 47250 | 0.533 | | | |
| 7936 | 48825 | 0.516 | | | |

Fig.10

| Pixel Clock;25.2 MHz | | | | | | | | |
|---|---|---|---|---|---|---|---|---|
| audio sampling frequency | | | | | | | | |
| 44.1(kHz) ① | | | | | | | | |
| N | CTS | frequency of phase comparison clock/kHz | N | CTS | frequency of phase comparison clock/kHz | N | CTS | frequency of phase comparison clock/kHz |
| 1904 | 8500 | 2.965 | 2968 | 13250 | 1.902 | 4032 | 18000 | 1.400 |
| 1932 | 8625 | 2.922 | 2996 | 13375 | 1.884 | 4060 | 18125 | 1.390 |
| 1960 | 8750 | 2.880 | 3024 | 13500 | 1.867 | 4088 | 18250 | 1.381 |
| 1988 | 8875 | 2.839 | 3052 | 13625 | 1.850 | 4116 | 18375 | 1.371 |
| 2016 | 9000 | 2.800 | 3080 | 13750 | 1.833 | 4144 | 18500 | 1.362 |
| 2044 | 9125 | 2.762 | 3108 | 13875 | 1.816 | 4172 | 18625 | 1.353 |
| 2072 | 9250 | 2.724 | 3136 | 14000 | 1.800 | 4200 | 18750 | 1.344 |
| 2100 | 9375 | 2.688 | 3164 | 14125 | 1.784 | 4228 | 18875 | 1.335 |
| 2128 | 9500 | 2.653 | 3192 | 14250 | 1.768 | 4256 | 19000 | 1.326 |
| 2156 | 9625 | 2.618 | 3220 | 14375 | 1.753 | 4284 | 19125 | 1.318 |
| 2184 | 9750 | 2.585 | 3248 | 14500 | 1.738 | 4312 | 19250 | 1.309 |
| 2212 | 9875 | 2.552 | 3276 | 14625 | 1.723 | 4340 | 19375 | 1.301 |
| 2240 | 10000 | 2.520 | 3304 | 14750 | 1.708 | 4368 | 19500 | 1.292 |
| 2268 | 10125 | 2.489 | 3332 | 14875 | 1.694 | 4396 | 19625 | 1.284 |
| 2296 | 10250 | 2.459 | 3360 | 15000 | 1.680 | 4424 | 19750 | 1.276 |
| 2324 | 10375 | 2.429 | 3388 | 15125 | 1.666 | 4452 | 19875 | 1.268 |
| 2352 | 10500 | 2.400 | 3416 | 15250 | 1.652 | 4480 | 20000 | 1.260 |
| 2380 | 10625 | 2.372 | 3444 | 15375 | 1.639 | 4508 | 20125 | 1.252 |
| 2408 | 10750 | 2.344 | 3472 | 15500 | 1.626 | 4536 | 20250 | 1.244 |
| 2436 | 10875 | 2.317 | 3500 | 15625 | 1.613 | 4564 | 20375 | 1.237 |
| 2464 | 11000 | 2.291 | 3528 | 15750 | 1.600 | 4592 | 20500 | 1.229 |
| 2492 | 11125 | 2.265 | 3556 | 15875 | 1.587 | 4620 | 20625 | 1.222 |
| 2520 | 11250 | 2.240 | 3584 | 16000 | 1.575 | 4648 | 20750 | 1.214 |
| 2548 | 11375 | 2.215 | 3612 | 16125 | 1.563 | 4676 | 20875 | 1.207 |
| 2576 | 11500 | 2.191 | 3640 | 16250 | 1.551 | 4704 | 21000 | 1.200 |
| 2604 | 11625 | 2.168 | 3668 | 16375 | 1.539 | 4732 | 21125 | 1.193 |
| 2632 | 11750 | 2.145 | 3696 | 16500 | 1.527 | 4760 | 21250 | 1.186 |
| 2660 | 11875 | 2.122 | 3724 | 16625 | 1.516 | 4788 | 21375 | 1.179 |
| 2688 | 12000 | 2.100 | 3752 | 16750 | 1.504 | 4816 | 21500 | 1.172 |
| 2716 | 12125 | 2.078 | 3780 | 16875 | 1.493 | 4844 | 21625 | 1.165 |
| 2744 | 12250 | 2.057 | 3808 | 17000 | 1.482 | 4872 | 21750 | 1.159 |
| 2772 | 12375 | 2.036 | 3836 | 17125 | 1.472 | 4900 | 21875 | 1.152 |
| 2800 | 12500 | 2.016 | 3864 | 17250 | 1.461 | 4928 | 22000 | 1.145 |
| 2828 | 12625 | 1.996 | 3892 | 17375 | 1.450 | 4956 | 22125 | 1.139 |
| 2856 | 12750 | 1.976 | 3920 | 17500 | 1.440 | 4984 | 22250 | 1.133 |
| 2884 | 12875 | 1.957 | 3948 | 17625 | 1.430 | 5012 | 22375 | 1.126 |
| 2912 | 13000 | 1.938 | 3976 | 17750 | 1.420 | 5040 | 22500 | 1.120 |
| 2940 | 13125 | 1.920 | 4004 | 17875 | 1.410 | 5068 | 22625 | 1.114 |

Fig.11

| Pixel Clock;25.2 MHz | | | | | | | | |
|---|---|---|---|---|---|---|---|---|
| audio sampling frequency | | | | | | | | |
| 44.1(kHz) ② | | | | | | | | |
| N | CTS | frequency of phase comparison clock/kHz | N | CTS | frequency of phase comparison clock/kHz | N | CTS | frequency of phase comparison clock/kHz |
| 5096 | 22750 | 1.108 | 6160 | 27500 | 0.916 | 7224 | 32250 | 0.781 |
| 5124 | 22875 | 1.102 | 6188 | 27625 | 0.912 | 7252 | 32375 | 0.778 |
| 5152 | 23000 | 1.096 | 6216 | 27750 | 0.908 | 7280 | 32500 | 0.775 |
| 5180 | 23125 | 1.090 | 6244 | 27875 | 0.904 | 7308 | 32625 | 0.772 |
| 5208 | 23250 | 1.084 | 6272 | 28000 | 0.900 | 7336 | 32750 | 0.769 |
| 5236 | 23375 | 1.078 | 6300 | 28125 | 0.896 | 7364 | 32875 | 0.767 |
| 5264 | 23500 | 1.072 | 6328 | 28250 | 0.892 | 7392 | 33000 | 0.764 |
| 5292 | 23625 | 1.067 | 6356 | 28375 | 0.888 | 7420 | 33125 | 0.761 |
| 5320 | 23750 | 1.061 | 6384 | 28500 | 0.884 | 7448 | 33250 | 0.758 |
| 5348 | 23875 | 1.055 | 6412 | 28625 | 0.880 | 7476 | 33375 | 0.755 |
| 5376 | 24000 | 1.050 | 6440 | 28750 | 0.877 | 7504 | 33500 | 0.752 |
| 5404 | 24125 | 1.045 | 6468 | 28875 | 0.873 | 7532 | 33625 | 0.749 |
| 5432 | 24250 | 1.039 | 6496 | 29000 | 0.869 | 7560 | 33750 | 0.747 |
| 5460 | 24375 | 1.034 | 6524 | 29125 | 0.865 | 7588 | 33875 | 0.744 |
| 5488 | 24500 | 1.029 | 6552 | 29250 | 0.862 | 7616 | 34000 | 0.741 |
| 5516 | 24625 | 1.023 | 6580 | 29375 | 0.858 | 7644 | 34125 | 0.738 |
| 5544 | 24750 | 1.018 | 6608 | 29500 | 0.854 | 7672 | 34250 | 0.736 |
| 5572 | 24875 | 1.013 | 6636 | 29625 | 0.851 | 7700 | 34375 | 0.733 |
| 5600 | 25000 | 1.008 | 6664 | 29750 | 0.847 | 7728 | 34500 | 0.730 |
| 5628 | 25125 | 1.003 | 6692 | 29875 | 0.844 | 7756 | 34625 | 0.728 |
| 5656 | 25250 | 0.998 | 6720 | 30000 | 0.840 | 7784 | 34750 | 0.725 |
| 5684 | 25375 | 0.993 | 6748 | 30125 | 0.837 | 7812 | 34875 | 0.723 |
| 5712 | 25500 | 0.988 | 6776 | 30250 | 0.833 | 7840 | 35000 | 0.720 |
| 5740 | 25625 | 0.983 | 6804 | 30375 | 0.830 | 7868 | 35125 | 0.717 |
| 5768 | 25750 | 0.979 | 6832 | 30500 | 0.826 | 7896 | 35250 | 0.715 |
| 5796 | 25875 | 0.974 | 6860 | 30625 | 0.823 | 7924 | 35375 | 0.712 |
| 5824 | 26000 | 0.969 | 6888 | 30750 | 0.820 | 7952 | 35500 | 0.710 |
| 5852 | 26125 | 0.965 | 6916 | 30875 | 0.816 | 7980 | 35625 | 0.707 |
| 5880 | 26250 | 0.960 | 6944 | 31000 | 0.813 | 8008 | 35750 | 0.705 |
| 5908 | 26375 | 0.955 | 6972 | 31125 | 0.810 | 8036 | 35875 | 0.702 |
| 5936 | 26500 | 0.951 | 7000 | 31250 | 0.806 | 8064 | 36000 | 0.700 |
| 5964 | 26625 | 0.946 | 7028 | 31375 | 0.803 | 8092 | 36125 | 0.698 |
| 5992 | 26750 | 0.942 | 7056 | 31500 | 0.800 | 8120 | 36250 | 0.695 |
| 6020 | 26875 | 0.938 | 7084 | 31625 | 0.797 | 8148 | 36375 | 0.693 |
| 6048 | 27000 | 0.933 | 7112 | 31750 | 0.794 | 8176 | 36500 | 0.690 |
| 6076 | 27125 | 0.929 | 7140 | 31875 | 0.791 | 8204 | 36625 | 0.688 |
| 6104 | 27250 | 0.925 | 7168 | 32000 | 0.788 | 8232 | 36750 | 0.686 |
| 6132 | 27375 | 0.921 | 7196 | 32125 | 0.784 | 8260 | 36875 | 0.683 |

Fig.12

| Pixel Clock;25.2 MHz | | | | | | | | |
|---|---|---|---|---|---|---|---|---|
| audio sampling frequency | | | | | | | | |
| 44.1(kHz) ③ | | | | | | | | |
| N | CTS | frequency of phase comparison clock/kHz | N | CTS | frequency of phase comparison clock/kHz | N | CTS | frequency of phase comparison clock/kHz |
| 8288 | 37000 | 0.681 | 9352 | 41750 | 0.604 | 10416 | 46500 | 0.542 |
| 8316 | 37125 | 0.679 | 9380 | 41875 | 0.602 | 10444 | 46625 | 0.540 |
| 8344 | 37250 | 0.677 | 9408 | 42000 | 0.600 | 10472 | 46750 | 0.539 |
| 8372 | 37375 | 0.674 | 9436 | 42125 | 0.598 | 10500 | 46875 | 0.538 |
| 8400 | 37500 | 0.672 | 9464 | 42250 | 0.596 | 10528 | 47000 | 0.536 |
| 8428 | 37625 | 0.670 | 9492 | 42375 | 0.595 | 10556 | 47125 | 0.535 |
| 8456 | 37750 | 0.668 | 9520 | 42500 | 0.593 | 10584 | 47250 | 0.533 |
| 8484 | 37875 | 0.665 | 9548 | 42625 | 0.591 | 10612 | 47375 | 0.532 |
| 8512 | 38000 | 0.663 | 9576 | 42750 | 0.589 | 10640 | 47500 | 0.531 |
| 8540 | 38125 | 0.661 | 9604 | 42875 | 0.588 | 10668 | 47625 | 0.529 |
| 8568 | 38250 | 0.659 | 9632 | 43000 | 0.586 | 10696 | 47750 | 0.528 |
| 8596 | 38375 | 0.657 | 9660 | 43125 | 0.584 | 10724 | 47875 | 0.526 |
| 8624 | 38500 | 0.655 | 9688 | 43250 | 0.583 | 10752 | 48000 | 0.525 |
| 8652 | 38625 | 0.652 | 9716 | 43375 | 0.581 | 10780 | 48125 | 0.524 |
| 8680 | 38750 | 0.650 | 9744 | 43500 | 0.579 | 10808 | 48250 | 0.522 |
| 8708 | 38875 | 0.648 | 9772 | 43625 | 0.578 | 10836 | 48375 | 0.521 |
| 8736 | 39000 | 0.646 | 9800 | 43750 | 0.576 | 10864 | 48500 | 0.520 |
| 8764 | 39125 | 0.644 | 9828 | 43875 | 0.574 | 10892 | 48625 | 0.518 |
| 8792 | 39250 | 0.642 | 9856 | 44000 | 0.573 | 10920 | 48750 | 0.517 |
| 8820 | 39375 | 0.640 | 9884 | 44125 | 0.571 | 10948 | 48875 | 0.516 |
| 8848 | 39500 | 0.638 | 9912 | 44250 | 0.569 | 10976 | 49000 | 0.514 |
| 8876 | 39625 | 0.636 | 9940 | 44375 | 0.568 | 11004 | 49125 | 0.513 |
| 8904 | 39750 | 0.634 | 9968 | 44500 | 0.566 | 11032 | 49250 | 0.512 |
| 8932 | 39875 | 0.632 | 9996 | 44625 | 0.565 | 11060 | 49375 | 0.510 |
| 8960 | 40000 | 0.630 | 10024 | 44750 | 0.563 | 11088 | 49500 | 0.509 |
| 8988 | 40125 | 0.628 | 10052 | 44875 | 0.562 | 11116 | 49625 | 0.508 |
| 9016 | 40250 | 0.626 | 10080 | 45000 | 0.560 | 11144 | 49750 | 0.507 |
| 9044 | 40375 | 0.624 | 10108 | 45125 | 0.558 | 11172 | 49875 | 0.505 |
| 9072 | 40500 | 0.622 | 10136 | 45250 | 0.557 | 11200 | 50000 | 0.504 |
| 9100 | 40625 | 0.620 | 10164 | 45375 | 0.555 | 11228 | 50125 | 0.503 |
| 9128 | 40750 | 0.618 | 10192 | 45500 | 0.554 | 11256 | 50250 | 0.501 |
| 9156 | 40875 | 0.617 | 10220 | 45625 | 0.552 | 11284 | 50375 | 0.500 |
| 9184 | 41000 | 0.615 | 10248 | 45750 | 0.551 | 11312 | 50500 | 0.499 |
| 9212 | 41125 | 0.613 | 10276 | 45875 | 0.549 | 11340 | 50625 | 0.498 |
| 9240 | 41250 | 0.611 | 10304 | 46000 | 0.548 | 11368 | 50750 | 0.497 |
| 9268 | 41375 | 0.609 | 10332 | 46125 | 0.546 | 11396 | 50875 | 0.495 |
| 9296 | 41500 | 0.607 | 10360 | 46250 | 0.545 | 11424 | 51000 | 0.494 |
| 9324 | 41625 | 0.605 | 10388 | 46375 | 0.543 | 11452 | 51125 | 0.493 |

Fig.13

| Pixel Clock;25.2 MHz | | | | | | | | |
|---|---|---|---|---|---|---|---|---|
| audio sampling frequency | | | | | | | | |
| 44.1(kHz) ④ | | | | | | | | |
| N | CTS | frequency of phase comparison clock/kHz | N | CTS | frequency of phase comparison clock/kHz | N | CTS | frequency of phase comparison clock/kHz |
| 11480 | 51250 | 0.492 | 12544 | 56000 | 0.450 | 13608 | 60750 | 0.415 |
| 11508 | 51375 | 0.491 | 12572 | 56125 | 0.449 | 13636 | 60875 | 0.414 |
| 11536 | 51500 | 0.489 | 12600 | 56250 | 0.448 | 13664 | 61000 | 0.413 |
| 11564 | 51625 | 0.488 | 12628 | 56375 | 0.447 | 13692 | 61125 | 0.412 |
| 11592 | 51750 | 0.487 | 12656 | 56500 | 0.446 | 13720 | 61250 | 0.411 |
| 11620 | 51875 | 0.486 | 12684 | 56625 | 0.445 | 13748 | 61375 | 0.411 |
| 11648 | 52000 | 0.485 | 12712 | 56750 | 0.444 | 13776 | 61500 | 0.410 |
| 11676 | 52125 | 0.483 | 12740 | 56875 | 0.443 | 13804 | 61625 | 0.409 |
| 11704 | 52250 | 0.482 | 12768 | 57000 | 0.442 | 13832 | 61750 | 0.408 |
| 11732 | 52375 | 0.481 | 12796 | 57125 | 0.441 | 13860 | 61875 | 0.407 |
| 11760 | 52500 | 0.480 | 12824 | 57250 | 0.440 | 13888 | 62000 | 0.406 |
| 11788 | 52625 | 0.479 | 12852 | 57375 | 0.439 | 13916 | 62125 | 0.406 |
| 11816 | 52750 | 0.478 | 12880 | 57500 | 0.438 | 13944 | 62250 | 0.405 |
| 11844 | 52875 | 0.477 | 12908 | 57625 | 0.437 | 13972 | 62375 | 0.404 |
| 11872 | 53000 | 0.475 | 12936 | 57750 | 0.436 | 14000 | 62500 | 0.403 |
| 11900 | 53125 | 0.474 | 12964 | 57875 | 0.435 | 14028 | 62625 | 0.402 |
| 11928 | 53250 | 0.473 | 12992 | 58000 | 0.434 | 14056 | 62750 | 0.402 |
| 11956 | 53375 | 0.472 | 13020 | 58125 | 0.434 | 14084 | 62875 | 0.401 |
| 11984 | 53500 | 0.471 | 13048 | 58250 | 0.433 | 14112 | 63000 | 0.400 |
| 12012 | 53625 | 0.470 | 13076 | 58375 | 0.432 | 14140 | 63125 | 0.399 |
| 12040 | 53750 | 0.469 | 13104 | 58500 | 0.431 | 14168 | 63250 | 0.398 |
| 12068 | 53875 | 0.468 | 13132 | 58625 | 0.430 | 14196 | 63375 | 0.398 |
| 12096 | 54000 | 0.467 | 13160 | 58750 | 0.429 | 14224 | 63500 | 0.397 |
| 12124 | 54125 | 0.466 | 13188 | 58875 | 0.428 | 14252 | 63625 | 0.396 |
| 12152 | 54250 | 0.465 | 13216 | 59000 | 0.427 | 14280 | 63750 | 0.395 |
| 12180 | 54375 | 0.463 | 13244 | 59125 | 0.426 | 14308 | 63875 | 0.395 |
| 12208 | 54500 | 0.462 | 13272 | 59250 | 0.425 | 14336 | 64000 | 0.394 |
| 12236 | 54625 | 0.461 | 13300 | 59375 | 0.424 | 14364 | 64125 | 0.393 |
| 12264 | 54750 | 0.460 | 13328 | 59500 | 0.424 | 14392 | 64250 | 0.392 |
| 12292 | 54875 | 0.459 | 13356 | 59625 | 0.423 | 14420 | 64375 | 0.391 |
| 12320 | 55000 | 0.458 | 13384 | 59750 | 0.422 | 14448 | 64500 | 0.391 |
| 12348 | 55125 | 0.457 | 13412 | 59875 | 0.421 | 14476 | 64625 | 0.390 |
| 12376 | 55250 | 0.456 | 13440 | 60000 | 0.420 | 14504 | 64750 | 0.389 |
| 12404 | 55375 | 0.455 | 13468 | 60125 | 0.419 | 14532 | 64875 | 0.388 |
| 12432 | 55500 | 0.454 | 13496 | 60250 | 0.418 | 14560 | 65000 | 0.388 |
| 12460 | 55625 | 0.453 | 13524 | 60375 | 0.417 | 14588 | 65125 | 0.387 |
| 12488 | 55750 | 0.452 | 13552 | 60500 | 0.417 | 14616 | 65250 | 0.386 |
| 12516 | 55875 | 0.451 | 13580 | 60625 | 0.416 | 14644 | 65375 | 0.385 |

Fig.14

| Pixel Clock;25.2 MHz | | | | | | | | |
|---|---|---|---|---|---|---|---|---|
| audio sampling frequency | | | | | | | | |
| 44.1(kHz) ⑤ | | | | | | | | |
| N | CTS | frequency of phase comparison clock/kHz | N | CTS | frequency of phase comparison clock/kHz | N | CTS | frequency of phase comparison clock/kHz |
| 14672 | 65500 | 0.385 | 15736 | 70250 | 0.359 | 16800 | 75000 | 0.336 |
| 14700 | 65625 | 0.384 | 15764 | 70375 | 0.358 | 16828 | 75125 | 0.335 |
| 14728 | 65750 | 0.383 | 15792 | 70500 | 0.357 | 16856 | 75250 | 0.335 |
| 14756 | 65875 | 0.383 | 15820 | 70625 | 0.357 | 16884 | 75375 | 0.334 |
| 14784 | 66000 | 0.382 | 15848 | 70750 | 0.356 | 16912 | 75500 | 0.334 |
| 14812 | 66125 | 0.381 | 15876 | 70875 | 0.356 | 16940 | 75625 | 0.333 |
| 14840 | 66250 | 0.380 | 15904 | 71000 | 0.355 | 16968 | 75750 | 0.333 |
| 14868 | 66375 | 0.380 | 15932 | 71125 | 0.354 | 16996 | 75875 | 0.332 |
| 14896 | 66500 | 0.379 | 15960 | 71250 | 0.354 | 17024 | 76000 | 0.332 |
| 14924 | 66625 | 0.378 | 15988 | 71375 | 0.353 | 17052 | 76125 | 0.331 |
| 14952 | 66750 | 0.378 | 16016 | 71500 | 0.352 | 17080 | 76250 | 0.330 |
| 14980 | 66875 | 0.377 | 16044 | 71625 | 0.352 | 17108 | 76375 | 0.330 |
| 15008 | 67000 | 0.376 | 16072 | 71750 | 0.351 | 17136 | 76500 | 0.329 |
| 15036 | 67125 | 0.375 | 16100 | 71875 | 0.351 | 17164 | 76625 | 0.329 |
| 15064 | 67250 | 0.375 | 16128 | 72000 | 0.350 | 17192 | 76750 | 0.328 |
| 15092 | 67375 | 0.374 | 16156 | 72125 | 0.349 | 17220 | 76875 | 0.328 |
| 15120 | 67500 | 0.373 | 16184 | 72250 | 0.349 | 17248 | 77000 | 0.327 |
| 15148 | 67625 | 0.373 | 16212 | 72375 | 0.348 | 17276 | 77125 | 0.327 |
| 15176 | 67750 | 0.372 | 16240 | 72500 | 0.348 | 17304 | 77250 | 0.326 |
| 15204 | 67875 | 0.371 | 16268 | 72625 | 0.347 | 17332 | 77375 | 0.326 |
| 15232 | 68000 | 0.371 | 16296 | 72750 | 0.346 | 17360 | 77500 | 0.325 |
| 15260 | 68125 | 0.370 | 16324 | 72875 | 0.346 | 17388 | 77625 | 0.325 |
| 15288 | 68250 | 0.369 | 16352 | 73000 | 0.345 | 17416 | 77750 | 0.324 |
| 15316 | 68375 | 0.369 | 16380 | 73125 | 0.345 | 17444 | 77875 | 0.324 |
| 15344 | 68500 | 0.368 | 16408 | 73250 | 0.344 | 17472 | 78000 | 0.323 |
| 15372 | 68625 | 0.367 | 16436 | 73375 | 0.343 | 17500 | 78125 | 0.323 |
| 15400 | 68750 | 0.367 | 16464 | 73500 | 0.343 | 17528 | 78250 | 0.322 |
| 15428 | 68875 | 0.366 | 16492 | 73625 | 0.342 | 17556 | 78375 | 0.322 |
| 15456 | 69000 | 0.365 | 16520 | 73750 | 0.342 | 17584 | 78500 | 0.321 |
| 15484 | 69125 | 0.365 | 16548 | 73875 | 0.341 | 17612 | 78625 | 0.321 |
| 15512 | 69250 | 0.364 | 16576 | 74000 | 0.341 | 17640 | 78750 | 0.320 |
| 15540 | 69375 | 0.363 | 16604 | 74125 | 0.340 | 17668 | 78875 | 0.319 |
| 15568 | 69500 | 0.363 | 16632 | 74250 | 0.339 | 17696 | 79000 | 0.319 |
| 15596 | 69625 | 0.362 | 16660 | 74375 | 0.339 | 17724 | 79125 | 0.318 |
| 15624 | 69750 | 0.361 | 16688 | 74500 | 0.338 | 17752 | 79250 | 0.318 |
| 15652 | 69875 | 0.361 | 16716 | 74625 | 0.338 | 17780 | 79375 | 0.317 |
| 15680 | 70000 | 0.360 | 16744 | 74750 | 0.337 | 17808 | 79500 | 0.317 |
| 15708 | 70125 | 0.359 | 16772 | 74875 | 0.337 | 17836 | 79625 | 0.316 |

Fig.15 (a)

| Pixel Clock;25.2 MHz ||| 
|---|---|---|
| audio sampling frequency ||| 
| 44.1(kHz) ⑥ ||| 
| N | CTS | frequency of phase comparison clock/kHz |
| 17864 | 79750 | 0.316 |
| 17892 | 79875 | 0.315 |
| 17920 | 80000 | 0.315 |
| 17948 | 80125 | 0.315 |
| 17976 | 80250 | 0.314 |
| 18004 | 80375 | 0.314 |
| 18032 | 80500 | 0.313 |
| 18060 | 80625 | 0.313 |
| 18088 | 80750 | 0.312 |
| 18116 | 80875 | 0.312 |
| 18144 | 81000 | 0.311 |
| 18172 | 81125 | 0.311 |
| 18200 | 81250 | 0.310 |
| 18228 | 81375 | 0.310 |
| 18256 | 81500 | 0.309 |
| 18284 | 81625 | 0.309 |
| 18312 | 81750 | 0.308 |
| 18340 | 81875 | 0.308 |
| 18368 | 82000 | 0.307 |
| 18396 | 82125 | 0.307 |
| 18424 | 82250 | 0.306 |
| 18452 | 82375 | 0.306 |
| 18480 | 82500 | 0.305 |
| 18508 | 82625 | 0.305 |
| 18536 | 82750 | 0.305 |
| 18564 | 82875 | 0.304 |
| 18592 | 83000 | 0.304 |
| 18620 | 83125 | 0.303 |
| 18648 | 83250 | 0.303 |
| 18676 | 83375 | 0.302 |
| 18704 | 83500 | 0.302 |
| 18732 | 83625 | 0.301 |
| 18760 | 83750 | 0.301 |
| 18788 | 83875 | 0.300 |
| 18816 | 84000 | 0.300 |
| 18844 | 84125 | 0.300 |

Fig.15 (b)

| Pixel Clock;25.2 MHz ||||||
|---|---|---|---|---|---|
| audio sampling frequency ||||||
| 48(kHz) ① ||||||
| N | CTS | frequency of phase comparison clock/kHz | N | CTS | frequency of phase comparison clock/kHz |
| 2048 | 8400 | 3.000 | 6912 | 28350 | 0.889 |
| 2176 | 8925 | 2.824 | 7040 | 28875 | 0.873 |
| 2304 | 9450 | 2.667 | 7168 | 29400 | 0.857 |
| 2432 | 9975 | 2.526 | 7296 | 29925 | 0.842 |
| 2560 | 10500 | 2.400 | 7424 | 30450 | 0.828 |
| 2688 | 11025 | 2.286 | 7552 | 30975 | 0.814 |
| 2816 | 11550 | 2.182 | 7680 | 31500 | 0.800 |
| 2944 | 12075 | 2.087 | 7808 | 32025 | 0.787 |
| 3072 | 12600 | 2.000 | 7936 | 32550 | 0.774 |
| 3200 | 13125 | 1.920 | 8064 | 33075 | 0.762 |
| 3328 | 13650 | 1.846 | 8192 | 33600 | 0.750 |
| 3456 | 14175 | 1.778 | 8320 | 34125 | 0.738 |
| 3584 | 14700 | 1.714 | 8448 | 34650 | 0.727 |
| 3712 | 15225 | 1.655 | 8576 | 35175 | 0.716 |
| 3840 | 15750 | 1.600 | 8704 | 35700 | 0.706 |
| 3968 | 16275 | 1.548 | 8832 | 36225 | 0.696 |
| 4096 | 16800 | 1.500 | 8960 | 36750 | 0.686 |
| 4224 | 17325 | 1.455 | 9088 | 37275 | 0.676 |
| 4352 | 17850 | 1.412 | 9216 | 37800 | 0.667 |
| 4480 | 18375 | 1.371 | 9344 | 38325 | 0.658 |
| 4608 | 18900 | 1.333 | 9472 | 38850 | 0.649 |
| 4736 | 19425 | 1.297 | 9600 | 39375 | 0.640 |
| 4864 | 19950 | 1.263 | 9728 | 39900 | 0.632 |
| 4992 | 20475 | 1.231 | 9856 | 40425 | 0.623 |
| 5120 | 21000 | 1.200 | 9984 | 40950 | 0.615 |
| 5248 | 21525 | 1.171 | 10112 | 41475 | 0.608 |
| 5376 | 22050 | 1.143 | 10240 | 42000 | 0.600 |
| 5504 | 22575 | 1.116 | 10368 | 42525 | 0.593 |
| 5632 | 23100 | 1.091 | 10496 | 43050 | 0.585 |
| 5760 | 23625 | 1.067 | 10624 | 43575 | 0.578 |
| 5888 | 24150 | 1.043 | 10752 | 44100 | 0.571 |
| 6016 | 24675 | 1.021 | 10880 | 44625 | 0.565 |
| 6144 | 25200 | 1.000 | 11008 | 45150 | 0.558 |
| 6272 | 25725 | 0.980 | 11136 | 45675 | 0.552 |
| 6400 | 26250 | 0.960 | 11264 | 46200 | 0.545 |
| 6528 | 26775 | 0.941 | 11392 | 46725 | 0.539 |
| 6656 | 27300 | 0.923 | 11520 | 47250 | 0.533 |
| 6784 | 27825 | 0.906 | 11648 | 47775 | 0.527 |

Fig.16

| Pixel Clock;25.2 MHz | | | | | |
|---|---|---|---|---|---|
| audio sampling frequency | | | | | |
| 48(kHz) ② | | | | | |
| N | CTS | frequency of phase comparison clock/kHz | N | CTS | frequency of phase comparison clock/kHz |
| 11776 | 48300 | 0.522 | 16640 | 68250 | 0.369 |
| 11904 | 48825 | 0.516 | 16768 | 68775 | 0.366 |
| 12032 | 49350 | 0.511 | 16896 | 69300 | 0.364 |
| 12160 | 49875 | 0.505 | 17024 | 69825 | 0.361 |
| 12288 | 50400 | 0.500 | 17152 | 70350 | 0.358 |
| 12416 | 50925 | 0.495 | 17280 | 70875 | 0.356 |
| 12544 | 51450 | 0.490 | 17408 | 71400 | 0.353 |
| 12672 | 51975 | 0.485 | 17536 | 71925 | 0.350 |
| 12800 | 52500 | 0.480 | 17664 | 72450 | 0.348 |
| 12928 | 53025 | 0.475 | 17792 | 72975 | 0.345 |
| 13056 | 53550 | 0.471 | 17920 | 73500 | 0.343 |
| 13184 | 54075 | 0.466 | 18048 | 74025 | 0.340 |
| 13312 | 54600 | 0.462 | 18176 | 74550 | 0.338 |
| 13440 | 55125 | 0.457 | 18304 | 75075 | 0.336 |
| 13568 | 55650 | 0.453 | 18432 | 75600 | 0.333 |
| 13696 | 56175 | 0.449 | 18560 | 76125 | 0.331 |
| 13824 | 56700 | 0.444 | 18688 | 76650 | 0.329 |
| 13952 | 57225 | 0.440 | 18816 | 77175 | 0.327 |
| 14080 | 57750 | 0.436 | 18944 | 77700 | 0.324 |
| 14208 | 58275 | 0.432 | 19072 | 78225 | 0.322 |
| 14336 | 58800 | 0.429 | 19200 | 78750 | 0.320 |
| 14464 | 59325 | 0.425 | 19328 | 79275 | 0.318 |
| 14592 | 59850 | 0.421 | 19456 | 79800 | 0.316 |
| 14720 | 60375 | 0.417 | 19584 | 80325 | 0.314 |
| 14848 | 60900 | 0.414 | 19712 | 80850 | 0.312 |
| 14976 | 61425 | 0.410 | 19840 | 81375 | 0.310 |
| 15104 | 61950 | 0.407 | 19968 | 81900 | 0.308 |
| 15232 | 62475 | 0.403 | 20096 | 82425 | 0.306 |
| 15360 | 63000 | 0.400 | 20224 | 82950 | 0.304 |
| 15488 | 63525 | 0.397 | 20352 | 83475 | 0.302 |
| 15616 | 64050 | 0.393 | 20480 | 84000 | 0.300 |
| 15744 | 64575 | 0.390 | | | |
| 15872 | 65100 | 0.387 | | | |
| 16000 | 65625 | 0.384 | | | |
| 16128 | 66150 | 0.381 | | | |
| 16256 | 66675 | 0.378 | | | |
| 16384 | 67200 | 0.375 | | | |
| 16512 | 67725 | 0.372 | | | |

Fig.17 (a)

| Pixel Clock;27.0 MHz | | |
|---|---|---|
| audio sampling frequency | | |
| 32(kHz) | | |
| N | CTS | frequency of phase comparison clock/kHz |
| 1536 | 10125 | 2.667 |
| 2048 | 13500 | 2.000 |
| 2560 | 16875 | 1.600 |
| 3072 | 20250 | 1.333 |
| 3584 | 23625 | 1.143 |
| 4096 | 27000 | 1.000 |
| 4608 | 30375 | 0.889 |
| 5120 | 33750 | 0.800 |
| 5632 | 37125 | 0.727 |
| 6144 | 40500 | 0.667 |
| 6656 | 43875 | 0.615 |
| 7168 | 47250 | 0.571 |
| 7680 | 50625 | 0.533 |
| 8192 | 54000 | 0.500 |
| 8704 | 57375 | 0.471 |
| 9216 | 60750 | 0.444 |
| 9728 | 64125 | 0.421 |
| 10240 | 67500 | 0.400 |
| 10752 | 70875 | 0.381 |
| 11264 | 74250 | 0.364 |
| 11776 | 77625 | 0.348 |
| 12288 | 81000 | 0.333 |
| 12800 | 84375 | 0.320 |
| 13312 | 87750 | 0.308 |

Fig.17 (b)

| Pixel Clock;27.0 MHz | | | | | |
|---|---|---|---|---|---|
| audio sampling frequency | | | | | |
| 44.1(kHz) | | | | | |
| N | CTS | frequency of phase comparison clock/kHz | N | CTS | frequency of phase comparison clock/kHz |
| 1960 | 9375 | 2.880 | 16856 | 80625 | 0.335 |
| 2352 | 11250 | 2.400 | 17248 | 82500 | 0.327 |
| 2744 | 13125 | 2.057 | 17640 | 84375 | 0.320 |
| 3136 | 15000 | 1.800 | 18032 | 86250 | 0.313 |
| 3528 | 16875 | 1.600 | 18424 | 88125 | 0.306 |
| 3920 | 18750 | 1.440 | 18816 | 90000 | 0.300 |
| 4312 | 20625 | 1.309 | | | |
| 4704 | 22500 | 1.200 | | | |
| 5096 | 24375 | 1.108 | | | |
| 5488 | 26250 | 1.029 | | | |
| 5880 | 28125 | 0.960 | | | |
| 6272 | 30000 | 0.900 | | | |
| 6664 | 31875 | 0.847 | | | |
| 7056 | 33750 | 0.800 | | | |
| 7448 | 35625 | 0.758 | | | |
| 7840 | 37500 | 0.720 | | | |
| 8232 | 39375 | 0.686 | | | |
| 8624 | 41250 | 0.655 | | | |
| 9016 | 43125 | 0.626 | | | |
| 9408 | 45000 | 0.600 | | | |
| 9800 | 46875 | 0.576 | | | |
| 10192 | 48750 | 0.554 | | | |
| 10584 | 50625 | 0.533 | | | |
| 10976 | 52500 | 0.514 | | | |
| 11368 | 54375 | 0.497 | | | |
| 11760 | 56250 | 0.480 | | | |
| 12152 | 58125 | 0.465 | | | |
| 12544 | 60000 | 0.450 | | | |
| 12936 | 61875 | 0.436 | | | |
| 13328 | 63750 | 0.424 | | | |
| 13720 | 65625 | 0.411 | | | |
| 14112 | 67500 | 0.400 | | | |
| 14504 | 69375 | 0.389 | | | |
| 14896 | 71250 | 0.379 | | | |
| 15288 | 73125 | 0.369 | | | |
| 15680 | 75000 | 0.360 | | | |
| 16072 | 76875 | 0.351 | | | |
| 16464 | 78750 | 0.343 | | | |

Fig.18

| Pixel Clock;27.0 MHz | | | | | |
|---|---|---|---|---|---|
| audio sampling frequency | | | | | |
| 48(kHz) | | | | | |
| N | CTS | frequency of phase comparison clock/kHz | N | CTS | frequency of phase comparison clock/kHz |
| 2048 | 9000 | 3.000 | 11776 | 51750 | 0.522 |
| 2304 | 10125 | 2.667 | 12032 | 52875 | 0.511 |
| 2560 | 11250 | 2.400 | 12288 | 54000 | 0.500 |
| 2816 | 12375 | 2.182 | 12544 | 55125 | 0.490 |
| 3072 | 13500 | 2.000 | 12800 | 56250 | 0.480 |
| 3328 | 14625 | 1.846 | 13056 | 57375 | 0.471 |
| 3584 | 15750 | 1.714 | 13312 | 58500 | 0.462 |
| 3840 | 16875 | 1.600 | 13568 | 59625 | 0.453 |
| 4096 | 18000 | 1.500 | 13824 | 60750 | 0.444 |
| 4352 | 19125 | 1.412 | 14080 | 61875 | 0.436 |
| 4608 | 20250 | 1.333 | 14336 | 63000 | 0.429 |
| 4864 | 21375 | 1.263 | 14592 | 64125 | 0.421 |
| 5120 | 22500 | 1.200 | 14848 | 65250 | 0.414 |
| 5376 | 23625 | 1.143 | 15104 | 66375 | 0.407 |
| 5632 | 24750 | 1.091 | 15360 | 67500 | 0.400 |
| 5888 | 25875 | 1.043 | 15616 | 68625 | 0.393 |
| 6144 | 27000 | 1.000 | 15872 | 69750 | 0.387 |
| 6400 | 28125 | 0.960 | 16128 | 70875 | 0.381 |
| 6656 | 29250 | 0.923 | 16384 | 72000 | 0.375 |
| 6912 | 30375 | 0.889 | 16640 | 73125 | 0.369 |
| 7168 | 31500 | 0.857 | 16896 | 74250 | 0.364 |
| 7424 | 32625 | 0.828 | 17152 | 75375 | 0.358 |
| 7680 | 33750 | 0.800 | 17408 | 76500 | 0.353 |
| 7936 | 34875 | 0.774 | 17664 | 77625 | 0.348 |
| 8192 | 36000 | 0.750 | 17920 | 78750 | 0.343 |
| 8448 | 37125 | 0.727 | 18176 | 79875 | 0.338 |
| 8704 | 38250 | 0.706 | 18432 | 81000 | 0.333 |
| 8960 | 39375 | 0.686 | 18688 | 82125 | 0.329 |
| 9216 | 40500 | 0.667 | 18944 | 83250 | 0.324 |
| 9472 | 41625 | 0.649 | 19200 | 84375 | 0.320 |
| 9728 | 42750 | 0.632 | 19456 | 85500 | 0.316 |
| 9984 | 43875 | 0.615 | 19712 | 86625 | 0.312 |
| 10240 | 45000 | 0.600 | 19968 | 87750 | 0.308 |
| 10496 | 46125 | 0.585 | 20224 | 88875 | 0.304 |
| 10752 | 47250 | 0.571 | 20480 | 90000 | 0.300 |
| 11008 | 48375 | 0.558 | | | |
| 11264 | 49500 | 0.545 | | | |
| 11520 | 50625 | 0.533 | | | |

Fig.19 (a)

| Pixel Clock; 27.0 × 1.001 MHz | | |
|---|---|---|
| audio sampling frequency | | |
| 32(kHz) | | |
| N | CTS | frequency of phase comparison clock/kHz |
| 4096 | 27027 | 1.000 |
| 8192 | 54054 | 0.500 |
| 12288 | 81081 | 0.333 |

Fig.19 (b)

| Pixel Clock; 27.0 × 1.001 MHz | | |
|---|---|---|
| audio sampling frequency | | |
| 44.1(kHz) | | |
| N | CTS | frequency of phase comparison clock/kHz |
| 2240 | 10725 | 2.520 |
| 2688 | 12870 | 2.100 |
| 3136 | 15015 | 1.800 |
| 3584 | 17160 | 1.575 |
| 4032 | 19305 | 1.400 |
| 4480 | 21450 | 1.260 |
| 4928 | 23595 | 1.145 |
| 5376 | 25740 | 1.050 |
| 5824 | 27885 | 0.969 |
| 6272 | 30030 | 0.900 |
| 6720 | 32175 | 0.840 |
| 7168 | 34320 | 0.788 |
| 7616 | 36465 | 0.741 |
| 8064 | 38610 | 0.700 |
| 8512 | 40755 | 0.663 |
| 8960 | 42900 | 0.630 |
| 9408 | 45045 | 0.600 |
| 9856 | 47190 | 0.573 |
| 10304 | 49335 | 0.548 |
| 10752 | 51480 | 0.525 |
| 11200 | 53625 | 0.504 |
| 11648 | 55770 | 0.485 |
| 12096 | 57915 | 0.467 |
| 12544 | 60060 | 0.450 |
| 12992 | 62205 | 0.434 |
| 13440 | 64350 | 0.420 |
| 13888 | 66495 | 0.406 |
| 14336 | 68640 | 0.394 |
| 14784 | 70785 | 0.382 |
| 15232 | 72930 | 0.371 |
| 15680 | 75075 | 0.360 |
| 16128 | 77220 | 0.350 |
| 16576 | 79365 | 0.341 |
| 17024 | 81510 | 0.332 |
| 17472 | 83655 | 0.323 |
| 17920 | 85800 | 0.315 |
| 18368 | 87945 | 0.307 |
| 18816 | 90090 | 0.300 |

Fig.19 (c)

| Pixel Clock; 27.0 × 1.001 MHz | | |
|---|---|---|
| audio sampling frequency | | |
| 48(kHz) | | |
| N | CTS | frequency of phase comparison clock/kHz |
| 2048 | 9009 | 3.000 |
| 4096 | 18018 | 1.500 |
| 6144 | 27027 | 1.000 |
| 8192 | 36036 | 0.750 |
| 10240 | 45045 | 0.600 |
| 12288 | 54054 | 0.500 |
| 14336 | 63063 | 0.429 |
| 16384 | 72072 | 0.375 |
| 18432 | 81081 | 0.333 |
| 20480 | 90090 | 0.300 |

Fig.20 (a)

| Pixel Clock;54.0 MHz | | | | | |
|---|---|---|---|---|---|
| audio sampling frequency | | | | | |
| 32(kHz) | | | | | |
| N | CTS | frequency of phase comparison clock/kHz | N | CTS | frequency of phase comparison clock/kHz |
| 1536 | 20250 | 2.667 | 11264 | 148500 | 0.364 |
| 1792 | 23625 | 2.286 | 11520 | 151875 | 0.356 |
| 2048 | 27000 | 2.000 | 11776 | 155250 | 0.348 |
| 2304 | 30375 | 1.778 | 12032 | 158625 | 0.340 |
| 2560 | 33750 | 1.600 | 12288 | 162000 | 0.333 |
| 2816 | 37125 | 1.455 | 12544 | 165375 | 0.327 |
| 3072 | 40500 | 1.333 | 12800 | 168750 | 0.320 |
| 3328 | 43875 | 1.231 | 13056 | 172125 | 0.314 |
| 3584 | 47250 | 1.143 | 13312 | 175500 | 0.308 |
| 3840 | 50625 | 1.067 | 13568 | 178875 | 0.302 |
| 4096 | 54000 | 1.000 | | | |
| 4352 | 57375 | 0.941 | | | |
| 4608 | 60750 | 0.889 | | | |
| 4864 | 64125 | 0.842 | | | |
| 5120 | 67500 | 0.800 | | | |
| 5376 | 70875 | 0.762 | | | |
| 5632 | 74250 | 0.727 | | | |
| 5888 | 77625 | 0.696 | | | |
| 6144 | 81000 | 0.667 | | | |
| 6400 | 84375 | 0.640 | | | |
| 6656 | 87750 | 0.615 | | | |
| 6912 | 91125 | 0.593 | | | |
| 7168 | 94500 | 0.571 | | | |
| 7424 | 97875 | 0.552 | | | |
| 7680 | 101250 | 0.533 | | | |
| 7936 | 104625 | 0.516 | | | |
| 8192 | 108000 | 0.500 | | | |
| 8448 | 111375 | 0.485 | | | |
| 8704 | 114750 | 0.471 | | | |
| 8960 | 118125 | 0.457 | | | |
| 9216 | 121500 | 0.444 | | | |
| 9472 | 124875 | 0.432 | | | |
| 9728 | 128250 | 0.421 | | | |
| 9984 | 131625 | 0.410 | | | |
| 10240 | 135000 | 0.400 | | | |
| 10496 | 138375 | 0.390 | | | |
| 10752 | 141750 | 0.381 | | | |
| 11008 | 145125 | 0.372 | | | |

Fig.20 (b)

| Pixel Clock;54.0 MHz | | |
|---|---|---|
| audio sampling frequency | | |
| 44.1(kHz) ① | | |
| N | CTS | frequency of phase comparison clock/kHz |
| 1960 | 18750 | 2.880 |
| 2156 | 20625 | 2.618 |
| 2352 | 22500 | 2.400 |
| 2548 | 24375 | 2.215 |
| 2744 | 26250 | 2.057 |
| 2940 | 28125 | 1.920 |
| 3136 | 30000 | 1.800 |
| 3332 | 31875 | 1.694 |
| 3528 | 33750 | 1.600 |
| 3724 | 35625 | 1.516 |
| 3920 | 37500 | 1.440 |
| 4116 | 39375 | 1.371 |
| 4312 | 41250 | 1.309 |
| 4508 | 43125 | 1.252 |
| 4704 | 45000 | 1.200 |
| 4900 | 46875 | 1.152 |
| 5096 | 48750 | 1.108 |
| 5292 | 50625 | 1.067 |
| 5488 | 52500 | 1.029 |
| 5684 | 54375 | 0.993 |
| 5880 | 56250 | 0.960 |
| 6076 | 58125 | 0.929 |
| 6272 | 60000 | 0.900 |
| 6468 | 61875 | 0.873 |
| 6664 | 63750 | 0.847 |
| 6860 | 65625 | 0.823 |
| 7056 | 67500 | 0.800 |
| 7252 | 69375 | 0.778 |
| 7448 | 71250 | 0.758 |
| 7644 | 73125 | 0.738 |
| 7840 | 75000 | 0.720 |
| 8036 | 76875 | 0.702 |
| 8232 | 78750 | 0.686 |
| 8428 | 80625 | 0.670 |
| 8624 | 82500 | 0.655 |
| 8820 | 84375 | 0.640 |
| 9016 | 86250 | 0.626 |
| 9212 | 88125 | 0.613 |

Fig.21 (a)

| Pixel Clock;54.0 MHz | | | | | |
|---|---|---|---|---|---|
| audio sampling frequency | | | | | |
| 44.1(kHz) ② | | | | | |
| N | CTS | frequency of phase comparison clock/kHz | N | CTS | frequency of phase comparison clock/kHz |
| 9408 | 90000 | 0.600 | 16856 | 161250 | 0.335 |
| 9604 | 91875 | 0.588 | 17052 | 163125 | 0.331 |
| 9800 | 93750 | 0.576 | 17248 | 165000 | 0.327 |
| 9996 | 95625 | 0.565 | 17444 | 166875 | 0.324 |
| 10192 | 97500 | 0.554 | 17640 | 168750 | 0.320 |
| 10388 | 99375 | 0.543 | 17836 | 170625 | 0.316 |
| 10584 | 101250 | 0.533 | 18032 | 172500 | 0.313 |
| 10780 | 103125 | 0.524 | 18228 | 174375 | 0.310 |
| 10976 | 105000 | 0.514 | 18424 | 176250 | 0.306 |
| 11172 | 106875 | 0.505 | 18620 | 178125 | 0.303 |
| 11368 | 108750 | 0.497 | 18816 | 180000 | 0.300 |
| 11564 | 110625 | 0.488 | | | |
| 11760 | 112500 | 0.480 | | | |
| 11956 | 114375 | 0.472 | | | |
| 12152 | 116250 | 0.465 | | | |
| 12348 | 118125 | 0.457 | | | |
| 12544 | 120000 | 0.450 | | | |
| 12740 | 121875 | 0.443 | | | |
| 12936 | 123750 | 0.436 | | | |
| 13132 | 125625 | 0.430 | | | |
| 13328 | 127500 | 0.424 | | | |
| 13524 | 129375 | 0.417 | | | |
| 13720 | 131250 | 0.411 | | | |
| 13916 | 133125 | 0.406 | | | |
| 14112 | 135000 | 0.400 | | | |
| 14308 | 136875 | 0.395 | | | |
| 14504 | 138750 | 0.389 | | | |
| 14700 | 140625 | 0.384 | | | |
| 14896 | 142500 | 0.379 | | | |
| 15092 | 144375 | 0.374 | | | |
| 15288 | 146250 | 0.369 | | | |
| 15484 | 148125 | 0.365 | | | |
| 15680 | 150000 | 0.360 | | | |
| 15876 | 151875 | 0.356 | | | |
| 16072 | 153750 | 0.351 | | | |
| 16268 | 155625 | 0.347 | | | |
| 16464 | 157500 | 0.343 | | | |
| 16660 | 159375 | 0.339 | | | |

Fig.21 (b)

| Pixel Clock;54.0 MHz | | |
|---|---|---|
| audio sampling frequency | | |
| 48(kHz) ① | | |
| N | CTS | frequency of phase comparison clock/kHz |
| 2048 | 18000 | 3.000 |
| 2176 | 19125 | 2.824 |
| 2304 | 20250 | 2.667 |
| 2432 | 21375 | 2.526 |
| 2560 | 22500 | 2.400 |
| 2688 | 23625 | 2.286 |
| 2816 | 24750 | 2.182 |
| 2944 | 25875 | 2.087 |
| 3072 | 27000 | 2.000 |
| 3200 | 28125 | 1.920 |
| 3328 | 29250 | 1.846 |
| 3456 | 30375 | 1.778 |
| 3584 | 31500 | 1.714 |
| 3712 | 32625 | 1.655 |
| 3840 | 33750 | 1.600 |
| 3968 | 34875 | 1.548 |
| 4096 | 36000 | 1.500 |
| 4224 | 37125 | 1.455 |
| 4352 | 38250 | 1.412 |
| 4480 | 39375 | 1.371 |
| 4608 | 40500 | 1.333 |
| 4736 | 41625 | 1.297 |
| 4864 | 42750 | 1.263 |
| 4992 | 43875 | 1.231 |
| 5120 | 45000 | 1.200 |
| 5248 | 46125 | 1.171 |
| 5376 | 47250 | 1.143 |
| 5504 | 48375 | 1.116 |
| 5632 | 49500 | 1.091 |
| 5760 | 50625 | 1.067 |
| 5888 | 51750 | 1.043 |
| 6016 | 52875 | 1.021 |
| 6144 | 54000 | 1.000 |
| 6272 | 55125 | 0.980 |
| 6400 | 56250 | 0.960 |
| 6528 | 57375 | 0.941 |
| 6656 | 58500 | 0.923 |
| 6784 | 59625 | 0.906 |

Fig.22

| Pixel Clock;54.0 MHz | | | | | | | | |
|---|---|---|---|---|---|---|---|---|
| audio sampling frequency | | | | | | | | |
| 48(kHz) ② | | | | | | | | |
| N | CTS | frequency of phase comparison clock/kHz | N | CTS | frequency of phase comparison clock/kHz | N | CTS | frequency of phase comparison clock/kHz |
| 6912 | 60750 | 0.889 | 11776 | 103500 | 0.522 | 16640 | 146250 | 0.369 |
| 7040 | 61875 | 0.873 | 11904 | 104625 | 0.516 | 16768 | 147375 | 0.366 |
| 7168 | 63000 | 0.857 | 12032 | 105750 | 0.511 | 16896 | 148500 | 0.364 |
| 7296 | 64125 | 0.842 | 12160 | 106875 | 0.505 | 17024 | 149625 | 0.361 |
| 7424 | 65250 | 0.828 | 12288 | 108000 | 0.500 | 17152 | 150750 | 0.358 |
| 7552 | 66375 | 0.814 | 12416 | 109125 | 0.495 | 17280 | 151875 | 0.356 |
| 7680 | 67500 | 0.800 | 12544 | 110250 | 0.490 | 17408 | 153000 | 0.353 |
| 7808 | 68625 | 0.787 | 12672 | 111375 | 0.485 | 17536 | 154125 | 0.350 |
| 7936 | 69750 | 0.774 | 12800 | 112500 | 0.480 | 17664 | 155250 | 0.348 |
| 8064 | 70875 | 0.762 | 12928 | 113625 | 0.475 | 17792 | 156375 | 0.345 |
| 8192 | 72000 | 0.750 | 13056 | 114750 | 0.471 | 17920 | 157500 | 0.343 |
| 8320 | 73125 | 0.738 | 13184 | 115875 | 0.466 | 18048 | 158625 | 0.340 |
| 8448 | 74250 | 0.727 | 13312 | 117000 | 0.462 | 18176 | 159750 | 0.338 |
| 8576 | 75375 | 0.716 | 13440 | 118125 | 0.457 | 18304 | 160875 | 0.336 |
| 8704 | 76500 | 0.706 | 13568 | 119250 | 0.453 | 18432 | 162000 | 0.333 |
| 8832 | 77625 | 0.696 | 13696 | 120375 | 0.449 | 18560 | 163125 | 0.331 |
| 8960 | 78750 | 0.686 | 13824 | 121500 | 0.444 | 18688 | 164250 | 0.329 |
| 9088 | 79875 | 0.676 | 13952 | 122625 | 0.440 | 18816 | 165375 | 0.327 |
| 9216 | 81000 | 0.667 | 14080 | 123750 | 0.436 | 18944 | 166500 | 0.324 |
| 9344 | 82125 | 0.658 | 14208 | 124875 | 0.432 | 19072 | 167625 | 0.322 |
| 9472 | 83250 | 0.649 | 14336 | 126000 | 0.429 | 19200 | 168750 | 0.320 |
| 9600 | 84375 | 0.640 | 14464 | 127125 | 0.425 | 19328 | 169875 | 0.318 |
| 9728 | 85500 | 0.632 | 14592 | 128250 | 0.421 | 19456 | 171000 | 0.316 |
| 9856 | 86625 | 0.623 | 14720 | 129375 | 0.417 | 19584 | 172125 | 0.314 |
| 9984 | 87750 | 0.615 | 14848 | 130500 | 0.414 | 19712 | 173250 | 0.312 |
| 10112 | 88875 | 0.608 | 14976 | 131625 | 0.410 | 19840 | 174375 | 0.310 |
| 10240 | 90000 | 0.600 | 15104 | 132750 | 0.407 | 19968 | 175500 | 0.308 |
| 10368 | 91125 | 0.593 | 15232 | 133875 | 0.403 | 20096 | 176625 | 0.306 |
| 10496 | 92250 | 0.585 | 15360 | 135000 | 0.400 | 20224 | 177750 | 0.304 |
| 10624 | 93375 | 0.578 | 15488 | 136125 | 0.397 | 20352 | 178875 | 0.302 |
| 10752 | 94500 | 0.571 | 15616 | 137250 | 0.393 | 20480 | 180000 | 0.300 |
| 10880 | 95625 | 0.565 | 15744 | 138375 | 0.390 | | | |
| 11008 | 96750 | 0.558 | 15872 | 139500 | 0.387 | | | |
| 11136 | 97875 | 0.552 | 16000 | 140625 | 0.384 | | | |
| 11264 | 99000 | 0.545 | 16128 | 141750 | 0.381 | | | |
| 11392 | 100125 | 0.539 | 16256 | 142875 | 0.378 | | | |
| 11520 | 101250 | 0.533 | 16384 | 144000 | 0.375 | | | |
| 11648 | 102375 | 0.527 | 16512 | 145125 | 0.372 | | | |

Fig.23 (a)

| Pixel Clock; 74.25/1.001 MHz | | |
|---|---|---|
| audio sampling frequency | | |
| 32(kHz) | | |
| N | CTS | frequency of phase comparison clock/kHz |
| 11648 | 210937 ~210938 | 0.352 |
| 23296 | 421875 | 0.176 |
| 46592 | 843750 | 0.088 |
| 69888 | 1265625 | 0.059 |
| 93184 | 1687500 | 0.044 |
| 116480 | 2109375 | 0.035 |
| 139776 | 2531250 | 0.029 |

Fig.23 (b)

| Pixel Clock; 74.25/1.001 MHz | | |
|---|---|---|
| audio sampling frequency | | |
| 44.1(kHz) | | |
| N | CTS | frequency of phase comparison clock/kHz |
| 17836 | 234375 | 0.316 |

Fig.23 (c)

| Pixel Clock; 74.25/1.001 MHz | | |
|---|---|---|
| audio sampling frequency | | |
| 48(kHz) | | |
| N | CTS | frequency of phase comparison clock/kHz |
| 11648 | 140625 | 0.527 |

Fig.24 (a)

| Pixel Clock;74.25 MHz | | |
|---|---|---|
| audio sampling frequency | | |
| 32(kHz) | | |
| N | CTS | frequency of phase comparison clock/kHz |
| 2048 | 37125 | 2.000 |
| 4096 | 74250 | 1.000 |
| 6144 | 111375 | 0.667 |
| 8192 | 148500 | 0.500 |
| 10240 | 185625 | 0.400 |
| 12288 | 222750 | 0.333 |

Fig.24 (b)

| Pixel Clock;74.25 MHz | | |
|---|---|---|
| audio sampling frequency | | |
| 44.1(kHz) | | |
| N | CTS | frequency of phase comparison clock/kHz |
| 3136 | 41250 | 1.800 |
| 4704 | 61875 | 1.200 |
| 6272 | 82500 | 0.900 |
| 7840 | 103125 | 0.720 |
| 9408 | 123750 | 0.600 |
| 10976 | 144375 | 0.514 |
| 12544 | 165000 | 0.450 |
| 14112 | 185625 | 0.400 |
| 15680 | 206250 | 0.360 |
| 17248 | 226875 | 0.327 |
| 18816 | 247500 | 0.300 |

Fig.24 (c)

| Pixel Clock;74.25 MHz | | |
|---|---|---|
| audio sampling frequency | | |
| 48(kHz) | | |
| N | CTS | frequency of phase comparison clock/kHz |
| 2048 | 24750 | 3.000 |
| 3072 | 37125 | 2.000 |
| 4096 | 49500 | 1.500 |
| 5120 | 61875 | 1.200 |
| 6144 | 74250 | 1.000 |
| 7168 | 86625 | 0.857 |
| 8192 | 99000 | 0.750 |
| 9216 | 111375 | 0.667 |
| 10240 | 123750 | 0.600 |
| 11264 | 136125 | 0.545 |
| 12288 | 148500 | 0.500 |
| 13312 | 160875 | 0.462 |
| 14336 | 173250 | 0.429 |
| 15360 | 185625 | 0.400 |
| 16384 | 198000 | 0.375 |
| 17408 | 210375 | 0.353 |
| 18432 | 222750 | 0.333 |
| 19456 | 235125 | 0.316 |
| 20480 | 247500 | 0.300 |

Fig.25 (a)

| Pixel Clock; 148.5/1.001 MHz ||| 
|---|---|---|
| audio sampling frequency |||
| 32(kHz) |||
| N | CTS | frequency of phase comparison clock/kHz |
| 11648 | 421875 | 0.352 |

Fig.25 (b)

| Pixel Clock; 148.5/1.001 MHz ||| 
|---|---|---|
| audio sampling frequency |||
| 44.1(kHz) |||
| N | CTS | frequency of phase comparison clock/kHz |
| 8918 | 234375 | 0.633 |
| 17836 | 468750 | 0.316 |

Fig.25 (c)

| Pixel Clock; 148.5/1.001 MHz ||| 
|---|---|---|
| audio sampling frequency |||
| 48(kHz) |||
| N | CTS | frequency of phase comparison clock/kHz |
| 5824 | 140625 | 1.055 |
| 11648 | 281250 | 0.527 |
| 17472 | 421875 | 0.352 |

Fig.26 (a)

| Pixel Clock;148.5 MHz |||
|---|---|---|
| audio sampling frequency |||
| 32(kHz) |||
| N | CTS | frequency of phase comparison clock/kHz |
| 2048 | 74250 | 2.000 |
| 3072 | 111375 | 1.333 |
| 4096 | 148500 | 1.000 |
| 5120 | 185625 | 0.800 |
| 6144 | 222750 | 0.667 |
| 7168 | 259875 | 0.571 |
| 8192 | 297000 | 0.500 |
| 9216 | 334125 | 0.444 |
| 10240 | 371250 | 0.400 |
| 11264 | 408375 | 0.364 |
| 12288 | 445500 | 0.333 |
| 13312 | 482625 | 0.308 |

Fig.26 (b)

| Pixel Clock;148.5 MHz |||
|---|---|---|
| audio sampling frequency |||
| 44.1(kHz) |||
| N | CTS | frequency of phase comparison clock/kHz |
| 2352 | 61875 | 2.400 |
| 3136 | 82500 | 1.800 |
| 3920 | 103125 | 1.440 |
| 4704 | 123750 | 1.200 |
| 5488 | 144375 | 1.029 |
| 6272 | 165000 | 0.900 |
| 7056 | 185625 | 0.800 |
| 7840 | 206250 | 0.720 |
| 8624 | 226875 | 0.655 |
| 9408 | 247500 | 0.600 |
| 10192 | 268125 | 0.554 |
| 10976 | 288750 | 0.514 |
| 11760 | 309375 | 0.480 |
| 12544 | 330000 | 0.450 |
| 13328 | 350625 | 0.424 |
| 14112 | 371250 | 0.400 |
| 14896 | 391875 | 0.379 |
| 15680 | 412500 | 0.360 |
| 16464 | 433125 | 0.343 |
| 17248 | 453750 | 0.327 |
| 18032 | 474375 | 0.313 |
| 18816 | 495000 | 0.300 |

Fig.26 (c)

| Pixel Clock;148.5 MHz |||
|---|---|---|
| audio sampling frequency |||
| 48(kHz) |||
| N | CTS | frequency of phase comparison clock/kHz |
| 2048 | 49500 | 3.000 |
| 2560 | 61875 | 2.400 |
| 3072 | 74250 | 2.000 |
| 3584 | 86625 | 1.714 |
| 4096 | 99000 | 1.500 |
| 4608 | 111375 | 1.333 |
| 5120 | 123750 | 1.200 |
| 5632 | 136125 | 1.091 |
| 6144 | 148500 | 1.000 |
| 6656 | 160875 | 0.923 |
| 7168 | 173250 | 0.857 |
| 7680 | 185625 | 0.800 |
| 8192 | 198000 | 0.750 |
| 8704 | 210375 | 0.706 |
| 9216 | 222750 | 0.667 |
| 9728 | 235125 | 0.632 |
| 10240 | 247500 | 0.600 |
| 10752 | 259875 | 0.571 |
| 11264 | 272250 | 0.545 |
| 11776 | 284625 | 0.522 |
| 12288 | 297000 | 0.500 |
| 12800 | 309375 | 0.480 |
| 13312 | 321750 | 0.462 |
| 13824 | 334125 | 0.444 |
| 14336 | 346500 | 0.429 |
| 14848 | 358875 | 0.414 |
| 15360 | 371250 | 0.400 |
| 15872 | 383625 | 0.387 |
| 16384 | 396000 | 0.375 |
| 16896 | 408375 | 0.364 |
| 17408 | 420750 | 0.353 |
| 17920 | 433125 | 0.343 |
| 18432 | 445500 | 0.333 |
| 18944 | 457875 | 0.324 |
| 19456 | 470250 | 0.316 |
| 19968 | 482625 | 0.308 |
| 20480 | 495000 | 0.300 |

Fig.27 recommendation parameter ①

| audio sampling frequency 32kHz | | | |
|---|---|---|---|
| Pixel Clock (MHz) | N | CTS | frequency of phase comparison clock/kHz |
| 25.2/1.001 | 4576 | 28125 | 0.895 |
| 25.2 | 4096 | 25200 | 1.000 |
| 27 | 4096 | 27000 | 1.000 |
| 27*1.001 | 4096 | 27027 | 1.000 |
| 54 | 4096 | 54000 | 1.000 |
| 74.25/1.001 | 11648 | 210937 -210938 | 0.352 |
| 74.25 | 4096 | 74250 | 1.000 |
| 148.5/1.001 | 11648 | 421875 | 0.352 |
| 148.5 | 4096 | 148500 | 1.000 |
| others | 4096 | mesured | 1.000 |

| audio sampling frequency 44.1kHz | | | |
|---|---|---|---|
| Pixel Clock (MHz) | N | CTS | frequency of phase comparison clock/kHz |
| 25.2/1.001 | 7007 | 31250 | 0.806 |
| 25.2 | 6272 | 28000 | 0.900 |
| 27 | 6272 | 30000 | 0.900 |
| 27*1.001 | 6272 | 30030 | 0.900 |
| 54 | 6272 | 60000 | 0.900 |
| 74.25/1.001 | 17836 | 234375 | 0.316 |
| 74.25 | 6272 | 82500 | 0.900 |
| 148.5/1.001 | 8918 | 234375 | 0.633 |
| 148.5 | 6272 | 165000 | 0.900 |
| others | 6272 | mesured | 0.900 |

| audio sampling frequency 48kHz | | | |
|---|---|---|---|
| Pixel Clock (MHz) | N | CTS | frequency of phase comparison clock/kHz |
| 25.2/1.001 | 6864 | 28125 | 0.895 |
| 25.2 | 6144 | 25200 | 1.000 |
| 27 | 6144 | 27000 | 1.000 |
| 27*1.001 | 6144 | 27027 | 1.000 |
| 54 | 6144 | 54000 | 1.000 |
| 74.25/1.001 | 11648 | 140625 | 0.527 |
| 74.25 | 6144 | 74250 | 1.000 |
| 148.5/1.001 | 5824 | 140625 | 1.055 |
| 148.5 | 6144 | 148500 | 1.000 |
| others | 6144 | mesured | 1.000 |

Fig.28  recommendation parameter ②

| audio sampling frequency 88.2kHz ||||
|---|---|---|---|
| Pixel Clock (MHz) | N | CTS | frequency of phase comparison clock/kHz |
| 25.2/1.001 | 14014 | 31250 | 0.806 |
| 25.2 | 12544 | 28000 | 0.900 |
| 27 | 12544 | 30000 | 0.900 |
| 27*1.001 | 12544 | 30030 | 0.900 |
| 54 | 12544 | 60000 | 0.900 |
| 74.25/1.001 | 35672 | 234375 | 0.316 |
| 74.25 | 12544 | 82500 | 0.900 |
| 148.5/1.001 | 17836 | 234375 | 0.633 |
| 148.5 | 12544 | 165000 | 0.900 |
| others | 12544 | mesured | 0.900 |

| audio sampling frequency 96kHz ||||
|---|---|---|---|
| Pixel Clock (MHz) | N | CTS | frequency of phase comparison clock/kHz |
| 25.2/1.001 | 13728 | 28125 | 0.895 |
| 25.2 | 12288 | 25200 | 1.000 |
| 27 | 12288 | 27000 | 1.000 |
| 27*1.001 | 12288 | 27027 | 1.000 |
| 54 | 12288 | 54000 | 1.000 |
| 74.25/1.001 | 23296 | 140625 | 0.527 |
| 74.25 | 12288 | 74250 | 1.000 |
| 148.5/1.001 | 11648 | 140625 | 1.055 |
| 148.5 | 12288 | 148500 | 1.000 |
| others | 12288 | mesured | 1.000 |

| audio sampling frequency 176.4kHz ||||
|---|---|---|---|
| Pixel Clock (MHz) | N | CTS | frequency of phase comparison clock/kHz |
| 25.2/1.001 | 28028 | 31250 | 0.806 |
| 25.2 | 25088 | 28000 | 0.900 |
| 27 | 25088 | 30000 | 0.900 |
| 27*1.001 | 25088 | 30030 | 0.900 |
| 54 | 25088 | 60000 | 0.900 |
| 74.25/1.001 | 71344 | 234375 | 0.316 |
| 74.25 | 25088 | 82500 | 0.900 |
| 148.5/1.001 | 35672 | 234375 | 0.633 |
| 148.5 | 25088 | 165000 | 0.900 |
| others | 25088 | mesured | 0.900 |

| audio sampling frequency 192kHz ||||
|---|---|---|---|
| Pixel Clock (MHz) | N | CTS | frequency of phase comparison clock/kHz |
| 25.2/1.001 | 27456 | 28125 | 0.895 |
| 25.2 | 24576 | 25200 | 1.000 |
| 27 | 24576 | 27000 | 1.000 |
| 27*1.001 | 24576 | 27027 | 1.000 |
| 54 | 24576 | 54000 | 1.000 |
| 74.25/1.001 | 46592 | 140625 | 0.527 |
| 74.25 | 24576 | 74250 | 1.000 |
| 148.5/1.001 | 23296 | 140625 | 1.055 |
| 148.5 | 24576 | 148500 | 1.000 |
| others | 24576 | mesured | 1.000 |

Fig.29

| audio sampling frequency 44.1kHz ||||
| Pixel Clock (MHz) | N | CTS | frequency of phase comparison clock/kHz |
|---|---|---|---|
| 25.2/1.001 | 7007 | 31250 | 0.806 |
| 25.2 | 5656 | 25250 | 0.998 |
| 27 | 5488 | 26250 | 1.029 |
| 27*1.001 | 5824 | 27885 | 0.969 |
| 54 | 5684 | 54375 | 0.993 |
| 74.25/1.001 | 17836 | 234375 | 0.316 |
| 74.25 | 6272 | 82500 | 0.900 |
| 148.5/1.001 | 8918 | 234375 | 0.633 |
| 148.5 | 5488 | 144375 | 1.029 |

DATA TRANSMISSION DEVICE AND DATA RECEPTION DEVICE

TECHNICAL FIELD

The present invention relates to a data transmitter and a data receiver in a digital data transmission system in which a video signal source and a video display unit are connected, for example, through a DVI (Digital Video Interface) and, more particularly, to a data transmitter and a data receiver that can easily and satisfactorily transmit audio data through an existing interface for transmitting video data.

BACKGROUND ART

Recently, a standard that is referred to as DVI has been standardized for transmitting video data to a display unit in digital format when a video signal source such as a television tuner, a video player, or a personal computer device is connected to a video display unit such as a monitor receiver.

Details of the DVI standard are given in an embodiment which will be described later, but in brief, this DVI standard digitizes respective primary color signals R, G, and B of video data in units of pixels and transmits the digitized data to a display unit, thereby realizing transmission and display of high quality pictures. Further, the display unit can directly drive a display driver by the received video data in units of pixels, thereby achieving the display with a relatively simple processing structure.

However, since a cable which is defined according to the DVI standard basically transmits only video data, then when audio data are to be transmitted together with video data, the display unit should be connected to an audio output device such as a tuner, through an audio cable that is different from the DVI standard cable.

More specifically, considering a system configuration that transmits only video data, a video signal source 600 and a display unit 610 are connected with a DVI standard cable 620 as shown in FIG. 30, and video data that is encoded in accordance with the DVI standard is transmitted through the cable 620, whereby video data can be transmitted from the video signal source 600 to the display unit 610.

On the other hand, when video data and audio data are transmitted from a video/audio signal source 700 to a display unit 710 with speakers as shown in FIG. 31, the video/audio signal source 700 and the display unit 710 with speakers are connected by a DVI standard cable 620 and an audio signal cable 630 that is different from the cable 620, and the video data is transmitted through the DVI cable 620 while the audio data is transmitted through the audio signal cable 630. In this way, the video data that is outputted from the video/audio signal source 700 can be displayed on the display unit 710 with speakers while the sounds are outputted from speakers 711 and 712 that are attached to the display unit 710.

However, when the video data and the audio data are transmitted from the video/audio signal source 700 to the display unit 710 using the two separate cables for video data and audio data as shown in FIG. 31, the connection structure correspondingly becomes complicated. Therefore, it is more preferable that fewer cables should be used for connecting the devices.

As a technology of multiplexing video data and audio data to transmit the multiplexed data through one cable, a data transmission technology using a bus line has been conventionally standardized as IEEE (The Institute of Electrical and Electronics Engineers) 1394 scheme. When a bus line that is standardized according to IEEE1394 method is employed as a cable for connecting the devices, video data and audio data can be simultaneously transmitted through one cable. However, in order to perform data transmission using the IEEE1394 bus line, very complicated data processing is required, whereby a structure on a transmitting end for encoding data to be transmitted, or a structure on a receiving end for decoding data that is received via the bus line needs quite a large circuit construction, resulting in an increased cost.

Further, since the IEEE1394 method compressively encodes and multiplexes video data and audio data in view of the transmission rate or the like, the quality of picture is lower than the above-mentioned DVI standard that transmits only video data which is digitized in units of pixel.

When digitized audio data is to be transmitted together with video data, a clock for audio data should be transmitted together with a clock for video data, and accordingly a signal line for transmitting the audio clock is required. Further, as a high-speed signal is transmitted through the signal line for the audio clock transmission, jitter is adversely increased.

The present invention is made to solve the above-mentioned problems, and has for its object to provide a data transmitter that transmits audio data and data for generating an audio clock from a transmitting end using an existing interface for transmitting video data, and a data receiver that receives the audio data and the data for generating an audio clock, and generating the audio clock easily and satisfactorily, to reproduce the audio data on a receiving end using the existing interface.

DISCLOSURE OF THE INVENTION

According to Claim 1 of the present invention, there is provided a data transmitter that transmits video/audio data through a digital display connecting interface, including: a data processing unit for processing audio data to output transmission audio data; and a data superimposing unit for superimposing the transmission audio data upon video data to output video/audio data, this data processing unit includes: a frequency dividing means for frequency dividing an audio clock as a reference clock for the audio data using a predetermined frequency division parameter N, to generate a transmission audio clock having a period that is N times longer than the audio clock; and a count means for counting the period of the transmission audio clock generated by the frequency dividing means with utilizing a pixel clock as a reference clock for the video data to output the count value CTS, and generates the transmission audio data by adding additional information including the frequency division parameter N and the count value CTS to the audio data, and the transmission audio clock is a clock having a frequency of 300 Hz or higher.

Therefore, video data and audio data can be simultaneously transmitted using a transmission line for transmitting video data with utilizing the existing construction for transmitting video data as it is. Further, a frequency division parameter N that makes the frequency of an audio clock obtained by the frequency division higher than 300 Hz and the count value CTS are transmitted from the transmitting end. Therefore, when an audio clock is generated on the receiving end, it is possible to reduce the synchronization-pull-in time, and even when the pixel clock or the audio data sampling frequency of the data is changed during the data receiving, it is possible to generate an audio clock that enables to reduce the time for synchronization pull-in reestablished.

According to Claim 2 of the present invention, there is provided a data transmitter that transmits video/audio data through a digital display connecting interface, including: a data processing unit for processing audio data to output transmission audio data; and a data superimposing unit for superimposing the transmission audio data upon video data to output video/audio data, this data processing unit includes: a frequency dividing means for frequency dividing an audio clock as a reference clock for the audio data using a predetermined frequency division parameter N, to generate a transmission audio clock having a period that is N times longer than the audio clock; and a count means for counting the period of the transmission audio clock that has been generated by the frequency dividing means with utilizing a pixel clock as a reference clock for the video data to output the count value CTS, and generates the transmission audio data by adding additional information including the frequency division parameter N and the count value CTS to the audio data, and the transmission audio clock is a clock having a frequency of 3000 Hz or lower.

Therefore, video data and audio data can be simultaneously transmitted through a transmission line for transmitting video data with utilizing the existing construction for transmitting video data as it is. Further, since the frequency division parameter N that makes the frequency of an audio clock obtained by the frequency division lower than 3000 Hz and the count value CTS are transmitted from the transmitting end, when an audio clock is generated on the receiving end, it is possible to generate an audio clock that enables to suppress clock jitter, resulting in high-quality audio data.

According to Claim 3 of the present invention, there is provided a data transmitter that transmits video/audio data through a digital display connecting interface, including: a data processing unit for processing audio data to output transmission audio data; and a data superimposing unit for superimposing the transmission audio data upon video data to output video/audio data, this data processing unit includes: a frequency dividing means for frequency dividing an audio clock as a reference clock for the audio data using a predetermined frequency division parameter N, to generate a transmission audio clock having a period that is N times longer than the audio clock; and a count means for counting the period of the transmission audio clock that has been generated by the frequency dividing means with utilizing a pixel clock as a reference clock for the video data to output the count value CTS, and generates the transmission audio data by adding additional information including the frequency division parameter N and the count value CTS to the audio data, and the transmission audio clock is a clock having a frequency that is 300 Hz or higher, and 3000 Hz or lower.

Therefore, video data and audio data can be simultaneously transmitted through a transmission line for transmitting video data with utilizing the existing construction for transmitting video data as it is. Further, since the frequency division parameter N that makes the frequency of an audio clock obtained by the frequency division higher than 300 Hz and lower than 3000 Hz and the count value CTS are transmitted from the transmitting end, when an audio clock is generated on the receiving end, it is possible to generate an audio clock that enables to reduce the synchronization pull-in time or suppress the clock jitter, thereby generating high-quality audio data.

According to Claim 4 of the present invention, when the pixel clock is 25.2/1.00 MHz and the data sampling frequency of audio data is 32 kHz, the frequency division parameter N (N is an integer) and the count value CTS (CTS is an integer) have a relationship as shown in FIG. 8(*a*).

Therefore, when an audio clock is generated on the receiving end in cases where video data having the pixel clock of 25.2/1.001 MHz and audio data having the audio data sampling frequency of 32 kHz are transmitted together, it is possible to generate an audio clock that enables to reduce the synchronization pull-in time, or suppress the clock jitter, thereby generating high-quality audio data.

According to Claim 5 of the present invention, when the pixel clock is 25.2/1.001 MHz and the data sampling frequency of audio data is 44.1 kHz, the frequency division parameter N (N is an integer) and the count value CTS (CTS is an integer) have a relationship as shown in FIG. 8(*b*).

Therefore, when an audio clock is generated on the receiving end in cases where video data having the pixel clock of 25.2/1.001 MHz and audio data having the audio data sampling frequency of 44.1 kHz are transmitted together, it is possible to generate an audio clock that enables to reduce the synchronization pull-in time, or suppress the clock jitter, thereby generating high-quality audio data.

According to Claim 6 of the present invention, when the pixel clock is 25.2/1.001 MHz and the data sampling frequency of audio data is 48 kHz, the frequency division parameter N (N is an integer) and the count value CTS (CTS is an integer) have a relationship as shown in FIG. 8(*c*).

Therefore, when an audio clock is generated on the receiving end in cases where video data having the pixel clock of 25.2/1.001 MHz and audio data having the sampling frequency of 48 kHz are transmitted together, it is possible to generate an audio clock that enables to reduce the synchronization pull-in time, or suppress the clock jitter, thereby generating high-quality audio data.

According to Claim 7 of the present invention, when the pixel clock is 25.2 MHz and the data sampling frequency of audio data is 32 kHz, the frequency division parameter N (N is an integer) and the count value CTS (CTS is an integer) have a relationship as shown in FIG. 9.

Therefore, when an audio clock is generated on the receiving end in cases where video data having the pixel clock of 25.2 MHz and audio data having the sampling frequency of 32 kHz are transmitted together, it is possible to generate an audio clock that enables to reduce the synchronization pull-in time, or suppress the clock jitter, thereby generating high-quality audio data.

According to Claim 8 of the present invention, when the pixel clock is 25.2 MHz and the data sampling frequency of audio data is 44.1 kHz, the frequency division parameter N (N is an integer) and the count value CTS (CTS is an integer) have a relationship as shown in FIGS. 10, 11, 12, 13, 14 and 15(*a*).

Therefore, when an audio clock is generated on the receiving end in cases where video data having the pixel clock of 25.2 MHz and audio data having the sampling frequency of 44.1 kHz are transmitted together, it is possible to generate an audio clock that enables to reduce the synchronization pull-in time, or suppress the clock jitter, thereby generating high-quality audio data.

According to Claim 9 of the present invention, when the pixel clock is 25.2 MHz and the data sampling frequency of audio data is 48 kHz, the frequency division parameter N (N is an integer) and the count value CTS (CTS is an integer) have a relationship as shown in FIGS. 15(*b*) and 16.

Therefore, when an audio clock is generated on the receiving end in cases where video data having the pixel clock of 25.2 MHz and audio data having the sampling frequency of 48 kHz are transmitted together, it is possible to generate an audio clock that enables to reduce the synchronization pull-in time, or suppress the clock jitter, thereby generating high-quality audio data.

According to Claim 10 of the present invention, when the pixel clock is 27 MHz and the data sampling frequency of audio data is 32 kHz, the frequency division parameter N (N is an integer) and the count value CTS (CTS is an integer) have a relationship as shown in FIG. 17(*a*).

Therefore, when an audio clock is generated on the receiving end in cases where video data having the pixel clock of 27 MHz and audio data having the sampling frequency of 32 kHz are transmitted together, it is possible to generate an audio clock that enables to reduce the synchronization pull-in time, or suppress the clock jitter, thereby generating high-quality audio data.

According to Claim 11 of the present invention, when the pixel clock is 27 MHz and the data sampling frequency of audio data is 44.1 kHz, the frequency division parameter N (N is an integer) and the count value CTS (CTS is an integer) have a relationship as shown in FIG. 17(*b*).

Therefore, when an audio clock is generated on the receiving end in cases where video data having the pixel clock of 27 MHz and audio data having the sampling frequency of 44.1 kHz are transmitted together, it is possible to generate an audio clock that enables to reduce the synchronization pull-in time, or suppress the clock jitter, thereby generating high-quality audio data.

According to Claim 12 of the present invention, when the pixel clock is 27 MHz and the data sampling frequency of audio data is 48 kHz, the frequency division parameter N (N is an integer) and the count value CTS (CTS is an integer) have a relationship as shown in FIG. 18.

Therefore, when an audio clock is generated on the receiving end in cases where video data having the pixel clock of 27 MHz and audio data having the sampling frequency of 48 kHz are transmitted together, it is possible to generate an audio clock that enables to reduce the synchronization pull-in time, or suppress the clock jitter, thereby generating high-quality audio data.

According to Claim 13 of the present invention, when the pixel clock is 27×1.001 MHz and the data sampling frequency of audio data is 32 kHz, the frequency division parameter N (N is an integer) and the count value CTS (CTS is an integer) have a relationship as shown in FIG. 19(*a*).

Therefore, when an audio clock is generated on the receiving end in cases where video data having the pixel clock of 27×1.001 MHz and audio data having the sampling frequency of 32 kHz are transmitted together, it is possible to generate an audio clock that enables to reduce the synchronization pull-in time, or suppress the clock jitter, thereby generating high-quality audio data.

According to Claim 14 of the present invention, when the pixel clock is 27×1.001 MHz and the data sampling frequency of audio data is 44.1 kHz, the frequency division parameter N (N is an integer) and the count value CTS (CTS is an integer) have a relationship as shown in FIG. 19(*b*).

Therefore, when an audio clock is generated on the receiving end in cases where video data having the pixel clock of 27×1.001 MHz and audio data having the sampling frequency of 44.1 kHz are transmitted together, it is possible to generate an audio clock that enables to reduce the synchronization pull-in time, or suppress the clock jitter, thereby generating high-quality audio data.

According to Claim 15 of the present invention, when the pixel clock is 27×1.001 MHz and the data sampling frequency of audio data is 48 kHz, the frequency division parameter N (N is an integer) and the count value CTS (CTS is an integer) have a relationship as shown in FIG. 19(*c*).

Therefore, when an audio clock is generated on the receiving end in cases where video data having the pixel clock of 27×1.001 MHz and audio data having the sampling frequency of 48 kHz are transmitted together, it is possible to generate an audio clock that enables to reduce the synchronization pull-in time, or suppress the clock jitter, thereby generating high-quality audio data.

According to Claim 16 of the present invention, when the pixel clock is 54.0 MHz and the data sampling frequency of audio data is 32 kHz, the frequency division parameter N (N is an integer) and the count value CTS (CTS is an integer) have a relationship as shown in FIG. 20(*a*).

Therefore, when an audio clock is generated on the receiving end in cases where video data having the pixel clock of 54.0 MHz and audio data having the sampling frequency of 32 kHz are transmitted together, it is possible to generate an audio clock that enables to reduce the synchronization pull-in time, or suppress the clock jitter, thereby generating high-quality audio data.

According to Claim 17 of the present invention, when the pixel clock is 54.0 MHz and the data sampling frequency of audio data is 44.1 kHz, the frequency division parameter N (N is an integer) and the count value CTS (CTS is an integer) have a relationship as shown in FIGS. 20(*b*) and 21(*a*).

Therefore, when an audio clock is generated on the receiving end in cases where video data having the pixel clock of 54.0 MHz and audio data having the sampling frequency of 44.1 kHz are transmitted together, it is possible to generate an audio clock that enables to reduce the synchronization pull-in time, or suppress the clock jitter, thereby generating high-quality audio data.

According to Claim 18 of the present invention, when the pixel clock is 54.0 MHz and the data sampling frequency of audio data is 48 kHz, the frequency division parameter N (N is an integer) and the count value CTS (CTS is an integer) have a relationship as shown in FIGS. 21(*b*) and 22.

Therefore, when an audio clock is generated on the receiving end in cases where video data having the pixel clock of 54.0 MHz and audio data having the sampling frequency of 48 kHz are transmitted together, it is possible to generate an audio clock that enables to reduce the synchronization pull-in time, or suppress the clock jitter, thereby generating high-quality audio data.

According to Claim 19 of the present invention, when the pixel clock is 74.25/1.001 MHz and the data sampling frequency of audio data is 32 kHz, the relationship between the frequency division parameter N (N is an integer) and the count value CTS (CTS is an integer) is N=11648 and $210937 \leq CTS \leq 210938$.

Therefore, when an audio clock is generated on the receiving end in cases where video data having the pixel clock of 74.25/1.001 MHz and audio data having the sampling frequency of 32 kHz are transmitted together, it is possible to generate an audio clock that enables to reduce the synchronization pull-in time, or suppress the clock jitter, thereby generating high-quality audio data.

According to Claim 20 of the present invention, when the pixel clock is 74.25/1.001 MHz and the data sampling frequency of audio data is 44.1 kHz, the relationship between the frequency division parameter N (N is an integer) and the count value CTS (CTS is an integer) is N=17836 and CTS=234375.

Therefore, when an audio clock is generated on the receiving end in cases where video data having the pixel clock of 74.25/1.001 MHz and audio data having the sampling frequency of 44.1 kHz are transmitted together, it is possible to generate an audio clock that enables to reduce the synchronization pull-in time, or suppress the clock jitter, thereby generating high-quality audio data.

According to Claim 21 of the present invention, when the pixel clock is 74.25/1.001 MHz and the data sampling frequency of audio data is 48 kHz, the relationship between the frequency division parameter N (N is an integer) and the count value CTS (CTS is an integer) is N=11648 and CTS=140625.

Therefore, when an audio clock is generated on the receiving end in cases where video data having the pixel clock of 74.25/1.001 MHz and audio data having the sampling frequency of 48 kHz are transmitted together, it is possible to generate an audio clock that enables to reduce the synchronization pull-in time, or suppress the clock jitter, thereby generating high-quality audio data.

According to Claim 22 of the present invention, when the pixel clock is 74.25 MHz and the data sampling frequency of audio data is 32 kHz, the frequency division parameter N (N is an integer) and the count value CTS (CTS is an integer) have a relationship as shown in FIG. 24(*a*).

Therefore, when an audio clock is generated on the receiving end in cases where video data having the pixel clock of 74.25 MHz and audio data having the sampling frequency of 32 kHz are transmitted together, it is possible to generate an audio clock that enables to reduce the synchronization pull-in time, or suppress the clock jitter, thereby generating high-quality audio data.

According to Claim 23 of the present invention, when the pixel clock is 74.25 MHz and the data sampling frequency of audio data is 44.1 kHz, the frequency division parameter N (N is an integer) and the count value CTS (CTS is an integer) have a relationship as shown in FIG. 24(*b*).

Therefore, when an audio clock is generated on the receiving end in cases where video data having the pixel clock of 74.25 MHz and audio data having the sampling frequency of 44.1 kHz are transmitted together, it is possible to generate an audio clock that enables to reduce the synchronization pull-in time, or suppress the clock jitter, thereby generating high-quality audio data.

According to Claim 24 of the present invention, when the pixel clock is 74.25 MHz and the data sampling frequency of audio data is 48 kHz, the frequency division parameter N (N is an integer) and the count value CTS (CTS is an integer) have a relationship as shown in FIG. 24(*c*).

Therefore, when an audio clock is generated on the receiving end in cases where video data having the pixel clock of 74.25 MHz and audio data having the sampling frequency of 48 kHz are transmitted together, it is possible to generate an audio clock that enables to reduce the synchronization pull-in time, or suppress the clock jitter, thereby generating high-quality audio data.

According to Claim 25 of the present invention, when the pixel clock is 148.5/1.001 MHz and the data sampling frequency of audio data is 32 kHz, the frequency division parameter N (N is an integer) and the count value CTS (CTS is an integer) have a relationship as shown in FIG. 25(*a*).

Therefore, when an audio clock is generated on the receiving end in cases where video data having the pixel clock of 148.5/1.001 MHz and audio data having the sampling frequency of 32 kHz are transmitted together, it is possible to generate an audio clock that enables to reduce the synchronization pull-in time, or suppress the clock jitter, thereby generating high-quality audio data.

According to Claim 26 of the present invention, when the pixel clock is 148.5/1.001 MHz and the data sampling frequency of audio data is 44.1 kHz, the frequency division parameter N (N is an integer) and the count value CTS (CTS is an integer) have a relationship as shown in FIG. 25(*b*).

Therefore, when an audio clock is generated on the receiving end in cases where video data having the pixel clock of 148.5/1.00 MHz and audio data having the sampling frequency of 44.1 kHz are transmitted together, it is possible to generate an audio clock that enables to reduce the synchronization pull-in time, or suppress the clock jitter, thereby generating high-quality audio data.

According to Claim 27 of the present invention, when the pixel clock is 148.5/1.001 MHz and the data sampling frequency of audio data is 48 kHz, the frequency division parameter N (N is an integer) and the count value CTS (CTS is an integer) have a relationship as shown in FIG. 25(*c*).

Therefore, when an audio clock is generated on the receiving end in cases where video data having the pixel clock of 148.5/1.001 MHz and audio data having the sampling frequency of 48 kHz are transmitted together, it is possible to generate an audio clock that enables to reduce the synchronization pull-in time, or suppress the clock jitter, thereby generating high-quality audio data.

According to Claim 28 of the present invention, when the pixel clock is 148.5 MHz and the data sampling frequency of audio data is 32 kHz, the frequency division parameter N (N is an integer) and the count value CTS (CTS is an integer) have a relationship as shown in FIG. 26(*a*).

Therefore, when an audio clock is generated on the receiving end in cases where video data having the pixel clock of 148.5 MHz and audio data having the sampling frequency of 32 kHz are transmitted together, it is possible to generate an audio clock that enables to reduce the synchronization pull-in time, or suppress the clock jitter, thereby generating high-quality audio data.

According to Claim 29 of the present invention, when the pixel clock is 148.5 MHz and the data sampling frequency of audio data is 44.1 kHz, the frequency division parameter N (N is an integer) and the count value CTS (CTS is an integer) have a relationship as shown in FIG. 26(*b*).

Therefore, when an audio clock is generated on the receiving end in cases where video data having the pixel clock of 148.5 MHz and audio data having the sampling frequency of 44.1 kHz are transmitted together, it is possible to generate an audio clock that enables to reduce the synchronization pull-in time, or suppress the clock jitter, thereby generating high-quality audio data.

According to Claim 30 of the present invention, when the pixel clock is 148.5 MHz and the data sampling frequency of audio data is 48 kHz, the frequency division parameter N (N is an integer) and the count value CTS (CTS is an integer) have a relationship as shown in FIG. 26(*c*).

Therefore, when an audio clock is generated on the receiving end in cases where video data having the pixel clock of 148.5 MHz and audio data having the sampling frequency of 48 kHz are transmitted together, it is possible to generate an audio clock that enables to reduce the synchronization pull-in time, or suppress the clock jitter, thereby generating high-quality audio data.

According to Claim 31 of the present invention, there is provided a data receiver that receives video/audio data through a digital display connecting interface, including: a video/audio data separating unit for separating video data and transmission audio data from the video/audio data; and an audio clock generating unit for generating an audio clock as a reference clock for audio data, on the basis of a pixel clock as a reference clock for the video data and a frequency division parameter N that has been added to the transmission audio data, this audio clock generating unit includes: an oscillator that oscillates the audio clock in accordance with a control signal; a frequency dividing means for frequency dividing the pixel clock using a count value CTS included in the transmission audio data to generate a frequency division clock having a period that is CTS times longer than the pixel clock; and a phase control means for controlling the oscillator in accordance with the control signal that is generated on the basis of a difference in phase between the frequency division clock and a phase comparison clock that is obtained by dividing the audio clock by a frequency division parameter N.

Therefore, video data and audio data can be simultaneously transmitted through a transmission line for transmitting video data with utilizing the existing construction for transmitting video data as it is. Further, an audio clock that maintains synchronization can be generated on the receiving end.

According to Claim 32 of the present invention, the phase control means controls the oscillator on the basis of a difference in phase between the frequency division clock that is generated by the frequency dividing means and the phase comparison clock having a frequency that is nearest to 1000 Hz.

Therefore, when an audio clock is generated on the receiving end, it is possible to reduce the synchronization pull-in time, and suppress occurrence of jitter.

According to Claim 33 of the present invention, when the sampling frequency for the audio data is 44.1 kHz, the phase control means controls the oscillator on the basis of a difference in phase between the frequency division clock that is generated by the frequency dividing means, and the phase comparison clock having a frequency that is nearest to 900 Hz.

Therefore, when an audio clock is generated on the receiving end, it is possible to reduce the synchronization pull-in time and suppress occurrence of jitter. Further, commonality can be achieved among values of the frequency division parameter N, whereby the circuit design of the data receiver is simplified, resulting in reduction of the manufacturing cost of the receiver.

According to Claim 34 of the present invention, when the data sampling frequency of the audio data is 32 kHz or 48 kHz, and the pixel clock has a frequency other than 25.2/1.001 MHz, 25.022 MHz, 27.000 MHz, 27.0×1.001 MHz, 54.000 MHz, 74.25/1.001 MHz, 74.25 MHz, 148.5/1.00 MHz, and 148.5 MHz, the frequency division parameter N (N is an integer) is decided such that the phase comparison clock that is obtained by dividing the pixel clock by the frequency division parameter N has a frequency nearest to 1000 Hz.

Therefore, even when a pixel clock other than the above pixel clocks is inputted, an audio clock that maintains synchronization can be generated on the receiving end. Further, the circuit design of the data receiver is simplified, thereby reducing the manufacturing cost of the receiver.

According to Claim 35 of the present invention, when the data sampling frequency of the audio data is 44.1 kHz, and the pixel clock has a frequency other than 25.2/1.001 MHz, 25.022 MHz, 27.000 MHz, 27.0×1.001 MHz, 54.000 MHz, 74.25/1.001 MHz, 74.25 MHz, 148.5/1.001 MHz, and 148.5 MHz, the frequency division parameter N (N is an integer) is decided such that the phase comparison clock that is obtained by dividing the pixel clock by the frequency division parameter N has a frequency nearest to 900 Hz.

Therefore, even when a pixel clock other than the above pixel clocks is inputted, an audio clock that maintains synchronization can be generated on the receiving end. Further, the circuit design of the data receiver is simplified, thereby reducing the manufacturing cost of the receiver.

BRIEF DESCRIPTION OF THE DRAWINGS

FIG. 8 are diagrams showing possible values of the frequency division parameter N in a case where the pixel clock is 25.2/1.001 MHz according to an embodiment of the present invention, FIG. 8(a) showing a case where the audio sampling frequency is 32 kHz, FIG. 8(b) showing a case where the audio sampling frequency is 44.1 kHz, and FIG. 8(c) showing a case where the audio sampling frequency is 48 kHz.

FIG. 9 is a diagram showing possible values of the frequency division parameter N in a case where the pixel clock is 25.2 MHz and the audio sampling frequency is 32 kHz according to an embodiment of the present invention.

FIG. 10 is a diagram showing possible values of the frequency division parameter N in a case where the pixel clock is 25.2 MHz and the audio sampling frequency is 44.1 kHz according to an embodiment of the present invention.

FIG. 11 is a diagram showing possible values of the frequency division parameter N in a case where the pixel clock is 25.2 MHz and the audio sampling frequency is 44.1 kHz according to an embodiment of the present invention.

FIG. 12 is a diagram showing possible values of the frequency division parameter N in a case where the pixel clock is 25.2 MHz and the audio sampling frequency is 44.1 kHz according to an embodiment of the present invention.

FIG. 13 is a diagram showing possible values of the frequency division parameter N in a case where the pixel clock is 25.2 MHz and the audio sampling clock is 44.1 kHz according to an embodiment of the present invention.

FIG. 14 is a diagram showing possible values of the frequency division parameter N in a case where the pixel clock is 25.2 MHz and the audio sampling frequency is 44.1 kHz according to an embodiment of the present invention.

FIG. 15 are diagrams showing possible values of the frequency division parameter N in a case where the pixel clock is 25.2 MHz and the audio sampling frequency is 44.1 kHz (FIG. 15(a)) and a case where the pixel clock is 25.2 MHz and the audio sampling frequency is 48 kHz (FIG. 15(b)) according to an embodiment of the present invention.

FIG. 16 is a diagram showing possible values of the frequency division parameter N in a case where the pixel clock is 25.2 MHz and the audio sampling frequency is 48 kHz according to an embodiment of the present invention.

FIG. 17 are diagrams showing possible values of the frequency division parameter N in a case where the pixel clock is 27 MHz and the audio sampling frequency is 32 kHz (FIG. 17(a)) and in a case where the pixel clock is 27 MHz and the audio sampling frequency is 44.1 kHz (FIG. 17(b)) according to an embodiment of the present invention.

FIG. 18 is a diagram showing possible values of the frequency division parameter N in a case where the pixel clock is 27 MHz and the audio sampling frequency is 48 kHz according to an embodiment of the present invention.

FIG. 19 are diagrams showing possible values of the frequency division parameter N in a case where the pixel clock is 27.0×1.001 MHz according to an embodiment of the present invention, FIG. 19(a) showing a case where the audio sampling frequency is 32 kHz, FIG. 19(b) showing a case where the audio sampling frequency is 44.1 kHz, and FIG. 19(c) showing a case where the audio sampling frequency is 48 kHz.

FIG. 20 are diagrams showing possible values of the frequency division parameter N in a case where the pixel clock is 54.0 MHz and the audio sampling frequency is 32 kHz (FIG. 20(a)), and a case where the pixel clock is 54.0 MHz and the audio sampling frequency is 44.1 kHz (FIG. 20(b)) according to an embodiment of the present invention.

FIG. 21 are diagrams showing possible values of the frequency division parameter N in a case where the pixel clock is 54.0 MHz and the audio sampling frequency is 44.1 kHz (FIG. 21(a)), and a case where the pixel clock is 54.0 MHz and the audio sampling frequency is 48 kHz (FIG. 21(b)) according to an embodiment of the present invention.

FIG. 22 is a diagram showing possible values of the frequency division parameter N in a case where the pixel clock is 54.0 MHz and the audio sampling frequency is 48 kHz according to an embodiment of the present invention.

FIG. 23 are diagrams showing possible values of the frequency division parameter N in a case where the pixel clock is 74.25/1.001 MHz according to an embodiment of the present invention, FIG. 23(a) showing a case where the audio sampling frequency is 32 kHz, FIG. 23(b) showing a case where the audio sampling frequency is 44.1 kHz, and FIG. 23(c) showing a case where the audio sampling frequency is 48 kHz.

FIG. 24 are diagrams showing possible values of the frequency division parameter N when the pixel clock is 74.25 MHz according to an embodiment of the present invention, FIG. 24(a) showing a case where the audio sampling frequency is 32 kHz, FIG. 24(b) showing a case where the audio sampling frequency is 44.1 kHz, and FIG. 24(c) showing a case where the audio sampling frequency is 48 kHz.

FIG. 25 are diagrams showing possible values of the frequency division parameter N when the pixel clock is 148.5/1.001 MHz according to an embodiment of the present invention, FIG. 25(a) showing a case where the audio sampling frequency is 32 kHz, FIG. 25(b) showing a case where the audio sampling frequency is 44.1 kHz, and FIG. 25(c) showing a case where the audio sampling frequency is 48 kHz.

FIG. 26 are diagrams showing possible values of the frequency division parameter N when the pixel clock is 148.5 MHz according to an embodiment of the present invention, FIG. 26(a) showing a case where the audio sampling frequency is 32 kHz, FIG. 26(b) showing a case where the audio sampling frequency is 44.1 kHz, and FIG. 26(c) showing a case where the audio sampling frequency is 48 kHz.

FIG. 27 is a diagram showing recommendation parameters of the frequency division parameter N for respective pixel clocks and respective audio sampling frequencies according to an embodiment of the present invention.

FIG. 28 is a diagram showing recommendation parameters of the frequency division parameter N for respective pixel clocks and respective audio sampling frequencies according to an embodiment of the present invention.

FIG. 29 is a diagrams showing values of the frequency division parameter N, which provide the frequency of the phase comparison clock that is nearest to 1 kHz at respective pixel clocks in a case where the audio sampling frequency is 44.1 kHz according to an embodiment of the present invention.

BEST MODE FOR CARRYING OUT THE INVENTION

Embodiment 1

Hereinafter, an embodiment of the present invention will be described with reference to the figures.

A digital data transmission system according to this embodiment is adapted to transmit video data and audio data that are outputted from a video/audio signal source, such as a videocassette tape recorder/player, a video disk player, or a tuner, to a display unit such as a monitor receiver having a sound output function or a television receiver, through one transmission cable. Here, a cable that transmits data based on a standard which is referred to as DVI (Digital Visual Interface) is utilized for the transmission cable.

Initially, the digital data transmission system according to the embodiment will be described with reference to FIGS. 1 to 3.

Figure 1:
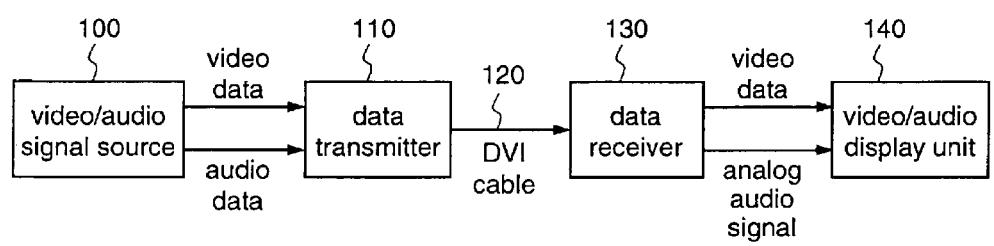
FIG. 1 is a block diagram illustrating an entire construction of a digital data transmission system according to a first embodiment of the present invention.

FIG. 1 is a diagram illustrating an entire construction of a digital data transmission system according to this embodiment. In this figure, reference numeral 100 denotes a video/audio signal source such as a videotape recorder/player, a video disk player, and a tuner. Numeral 110 denotes a data transmitter that superimpose video data and audio data which are outputted from the video/audio signal source 100, and transmits the superimposed data to a DVI cable. Numeral 120 denotes a DVI cable. Numeral 130 denotes a data receiver that receives a video/audio data superimposed signal (video/audio signal) that has been transmitted through the DVI cable 120, and outputs video data and an analog audio data signal. Numeral 140 denotes a video/audio display unit that receives the video data and the analog audio signal from the data receiver 130, and performs video display and audio outputting. Each of connector portions (not shown) of the data transmitter 110 and the data receiver 130 to which the DVI cable 120 is connected is formed for example by a 24-pin connector, and the 24 pins of the connector of the data transmitter 110 and the 24 pins of the connector of the data receiver 130 are connected with the DVI cable 120.

Figure 2:
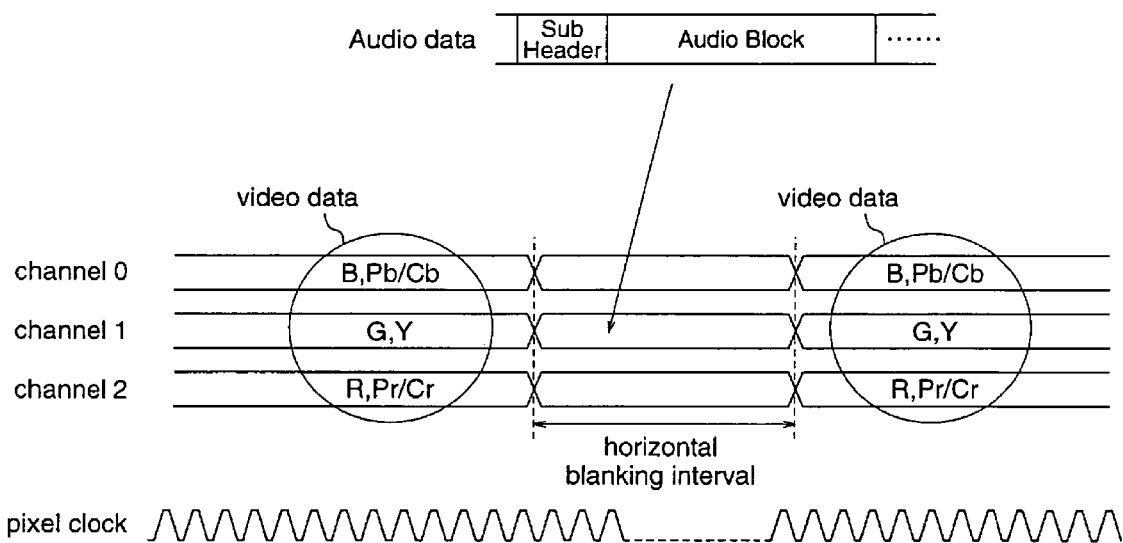
FIG. 2 is a diagram explaining an operation for superimposing audio data upon video data that is transmitted in DVI format.

According to this embodiment, in order to transmit audio data by the digital data transmission system having the above construction, transmission audio data is superimposed upon video data in DVI format, and then the obtained video/audio superimposed signal is transmitted from the data transmitter 110 to the data receiver 130 through the DVI cable 120, together with a horizontal blank sync signal or a pixel clock, as shown in FIG. 2. Further, when the audio data that has been transmitted with being superimposed upon video data is reproduced by the data receiver 130 as an analog audio signal, an audio clock as an audio data reference clock is needed. However, since the audio clock cannot be transmitted directly by the DVI cable 120, the data transmitter 110 adds additional information to the audio data, such as a frequency division parameter N that is used to divide the audio clock to obtain a transmission audio clock having a common multiple frequency between the pixel clock and the audio clock, and a count value CTS that is obtained by counting the period of the transmission audio clock with the pixel clock, and superimposes the transmission audio data including the additional information upon the video data, transmits the superimposed data to the data receiver 130, and then the data receiver 130 generates an audio clock that maintains the synchronization on the basis of the frequency division parameter N and the count value CTS as the additional information.

Hereinafter, a structure of video data in DVI format, which is transmitted through the DVI cable 120 is described with reference to FIG. 2. When video data is transmitted, B data (Blue data) shown in channel 0, G data (Green data) shown in channel 1, and R data (Red data) shown in channel 2 are transmitted by the corresponding channels, respectively, as 8 bits data per pixel, i.e., 24 bits data per pixel in total for the three channels. When pixel data are practically transmitted by the DVI cable 120, 8 bit data are converted into 10 bit data. Further, pixel data of each channel is transmitted in synchronization with the pixel clock.

In the DVI format, pixel data for each channel is not transmitted during horizontal blanking intervals and vertical blanking intervals, but data that is defined as a horizontal sync signal HSYNC or a vertical sync signal VSYNC, or various kinds of control data are transmitted. Therefore, the digital data transmission system according to this embodiment superimposes transmission audio data that is generated by processing audio data, upon the horizontal blanking interval of any channel (transmission channel for G data, shown by channel 1 in FIG. 2).

Figure 3:
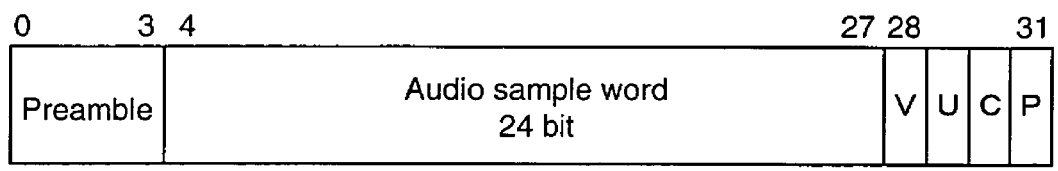
FIG. 3 is a diagram illustrating an example of a digital audio data structure.

The audio data that is inputted in this embodiment is, for example, audio data that is packetized in accordance with IEC (International Electrotechnical Commission) 60958 standard as shown in FIG. 3. A packet (sub-frame) of data based on IEC60958 standard is composed of 32 bits as shown in FIG. 3. A 4-bit preamble is located at the head, the subsequent 24-bit section contains audio data of one sample (audio sample word), and last four bits are sub-codes (VUCP). Data of one sample that is composed of less than 24 bits (for example 16 bits) may be contained.

The structures of the data transmitter 110 and the data receiver 130 according to this embodiment, which transmits and receives video data upon which the above-mentioned transmission audio data are superimposed, will be described in detail with reference to FIGS. 4 to 7.

Figure 4:
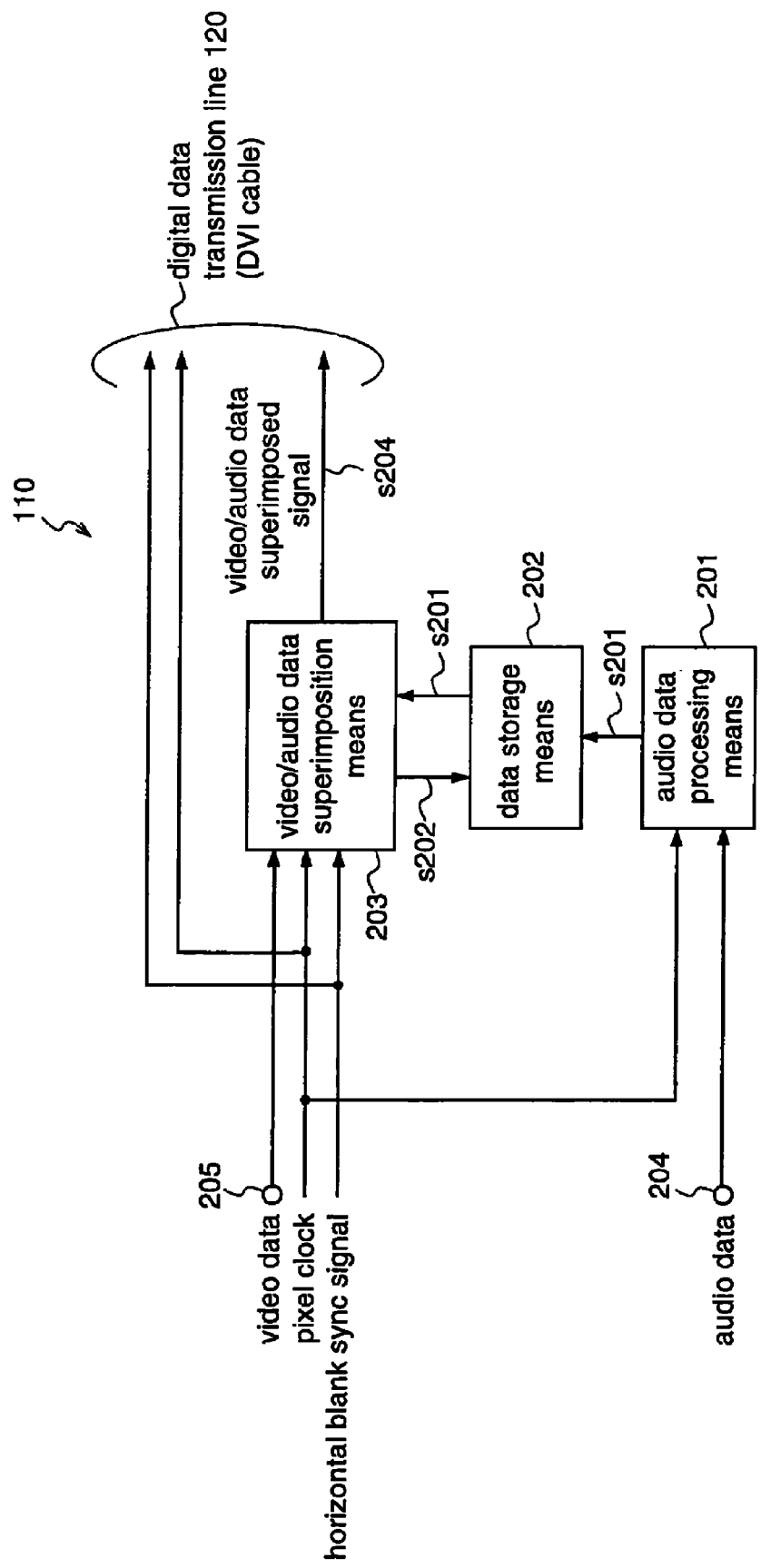
FIG. 4 is a block diagram illustrating a construction of a data transmitter according to an embodiment of the present invention.
Figure 5:
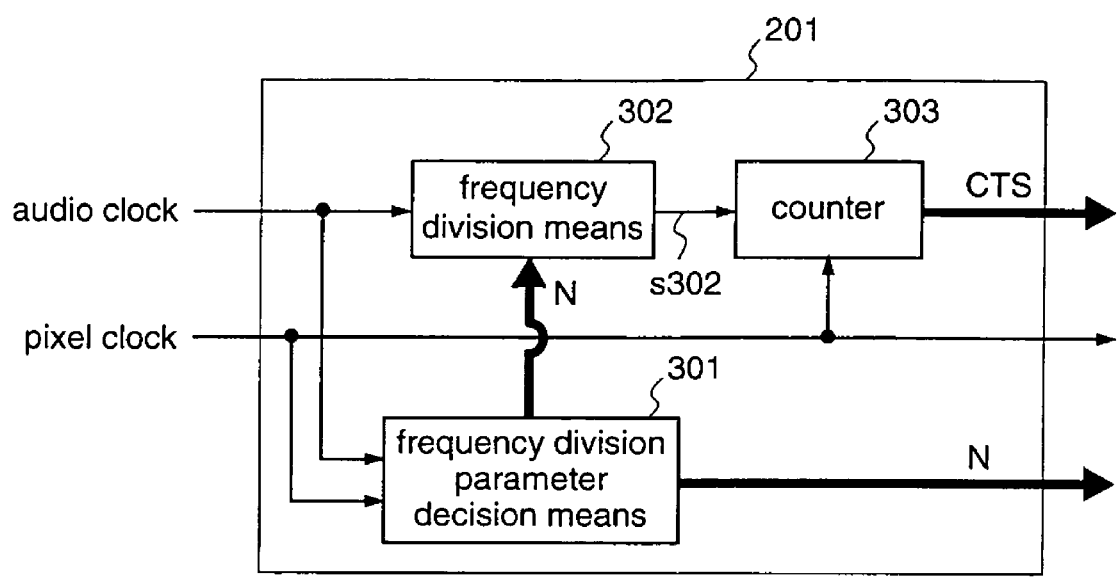
FIG. 5 is a block diagram illustrating components for obtaining a frequency division parameter N and a count value CST in an audio data processing means of a data transmitter according to an embodiment of the present invention.

Initially, FIG. 4 is a block diagram illustrating the structure of the data transmitter in the digital data transmission system according to this embodiment, and FIG. 5 is a block diagram illustrating components for generating the frequency division parameter N and the count value CTS in an audio data processing means of the data transmitter.

In FIG. 4, numeral 201 denotes an audio data processing means that adds additional information to digital audio data that is outputted from the video/audio signal source 100, and superimposes the audio data upon video data to create transmission audio data s201 that is transmitted to the data receiver 130. Numeral 202 denotes a data storage means that temporarily stores the transmission audio data s201 that is created by the audio data processing means 201. Numeral 203 denotes a video/audio data superposition means that generates a timing signal using a horizontal blank sync signal and a pixel clock of video data which are outputted from the video/audio signal source 100, and superimposes the transmission audio data s201 stored in the data storage means 202 at a predetermined position in the horizontal blanking interval of the video data outputted from the video/audio signal source 100 using the generated timing signal, thereby generating a video/audio data superimposed signal s204. Numeral 204 denotes an input terminal for audio data. Numeral 205 denotes an input terminal for video data.

To the data transmitter 110 having the above-mentioned structure, digital audio data is inputted from an audio processing unit (not shown) of the video/audio signal source 100 through the audio data input terminal 204, while video data encoded in accordance with the DVI standard is inputted from a video processing unit (not shown) of the video/audio signal source 100 through the video data input terminal 205. The digital audio data is inputted to the audio data processing means 201, while the video data is inputted to the video/audio data superimposition means 203.

The audio data processing means 201 decides a frequency division parameter N on the basis of the pixel clock of video data and the sampling frequency of audio data that are outputted from the video/audio signal source 100, and counts the period of a transmission audio clock that is N times longer than the audio clock, which is obtained by performing frequency division of the audio clock using the frequency division parameter N, with the pixel clock, to obtain the count value CTS, and adds additional information, such as the frequency division parameter N and the count value CTS, to the audio data, thereby generating transmission audio data s201.

Components of the audio data processing means 201 for generating the frequency division parameter N and the count value CTS will be described with reference to FIG. 5. To simplify the figure, only flows of clocks are shown while flows of data are not shown.

The audio clock and the pixel clock inputted to the audio data processing means 201 are inputted to a frequency division parameter decision means 301. The frequency division parameter decision means 301 decides the frequency division parameter N on the basis of the sampling frequency of the audio data and the pixel clock, and outputs the decided parameter. It is assumed here that the audio clock has a frequency that is 128 times higher than the sampling frequency of audio data.

The frequency division parameter N is decided as follows: A table indicating the relationship among the pixel clock, the sampling frequency of audio data, and the frequency division parameter N is previously provided to the frequency division parameter decision means 301, and an appropriate value is selected from the table that is previously provided to the frequency division parameter decision means 301 in accordance with the audio clock and the pixel clock inputted to the frequency division parameter decision means 301. Though not shown, when the video/audio signal source 100 is a CD or a DVD, and the data transmitter 110 includes a control means for controlling the digital data transmission system, the control means can directly capture the sampling frequency of audio data and the pixel clock value from a predetermined area in the CD or DVD, and output the same to the frequency division parameter decision means 301 in the audio data processing means 201, and then the frequency division parameter decision means 301 can decide the value of the frequency division parameter N in accordance with the outputted values. The possible values of the frequency division parameter N and the table that is previously provided to the frequency division parameter decision means 301 will be described later.

The frequency division parameter N that has been decided by the frequency division parameter decision means 301 is inputted to the frequency division means 302. The frequency division means 302 performs frequency division of the audio clock using the frequency division parameter N, thereby to generate a transmission audio clock s302 having a period that is N times longer than the audio clock. Then, the period of the generated transmission audio clock s302 is counted with the pixel clock by a counter 303, and the obtained count value CTS is outputted.

Though not shown in FIG. 5, a header including the additional information, such as the frequency division parameter N and the counter value CTS which have been obtained as described above, and the length of processed data, is added to the audio data by the audio data processing means 201, and data transformation into a format which is suitable for data transmission, such as transformation into multi-bit data, thereby generating the transmission audio data s201. In FIG. 5, the frequency division parameter N and the counter value CTS are shown as being outputted from the audio data processing means 201, but this indicates that the frequency division parameter N and the counter value CTS are outputted with being added to the above-mentioned transmission audio data s201.

Then, the transmission audio data s201 that has been generated by the audio data processing means 201 is temporarily stored in the data storage means 202, and inputted to the video/audio data superimposition means 203 in accordance with a reading signal s202 that is synchronized with an audio data superimposition timing signal which is generated by the video/audio data superimposition means 203.

Then, the video/audio data superimposition means 203 generates a superimposition timing signal for audio data, using the horizontal blank sync signal and the pixel clock which are supplied from the video/audio signal source 100.

More specifically, the video/audio data superimposition means 203 starts counting the pixel clock when the horizontal blank sync signal is inputted, and then outputs the reading signal s202 to the data storage means 202 at a timing when a predetermined count of "n" (n is an arbitrary integer) has been reached. The transmission audio data s201 that is temporarily stored in the data storage means 202 is inputted from the data storage means 202 to the video/audio data superimposition means 203 in response to the reading signal s202 that is outputted from the video/audio data superimposition means 203, and is superimposed at a predetermined position in the horizontal blanking interval of video data. For example, when the horizontal frequency of video data is 15.75 kHz and the sampling frequency of audio data is 48 kHz, one horizontal scanning period of video data is about 63.5 μsec (=1/15.75 kHz) and one sampling period of audio data is about 20.8 μsec (=1/48 kHz). Therefore, when a process for transmitting 4 frames of audio data by one horizontal line is carries out once each time a process for transmitting 3 frames of audio data by one horizontal line is carries out several tens of times, data transmission can be performed without delay of the audio data from the video data.

As described above, the data transmitter 110 according to this embodiment superimposes the previously-processed transmission audio data s201 to which additional information such as the frequency division parameter N and the count value CTS has been added, upon video data, thereby generating the video/audio data superimposed signal s204, and transmits the generated signal s204 to the data receiver 130 via the DVI cable 120.

Figure 6:
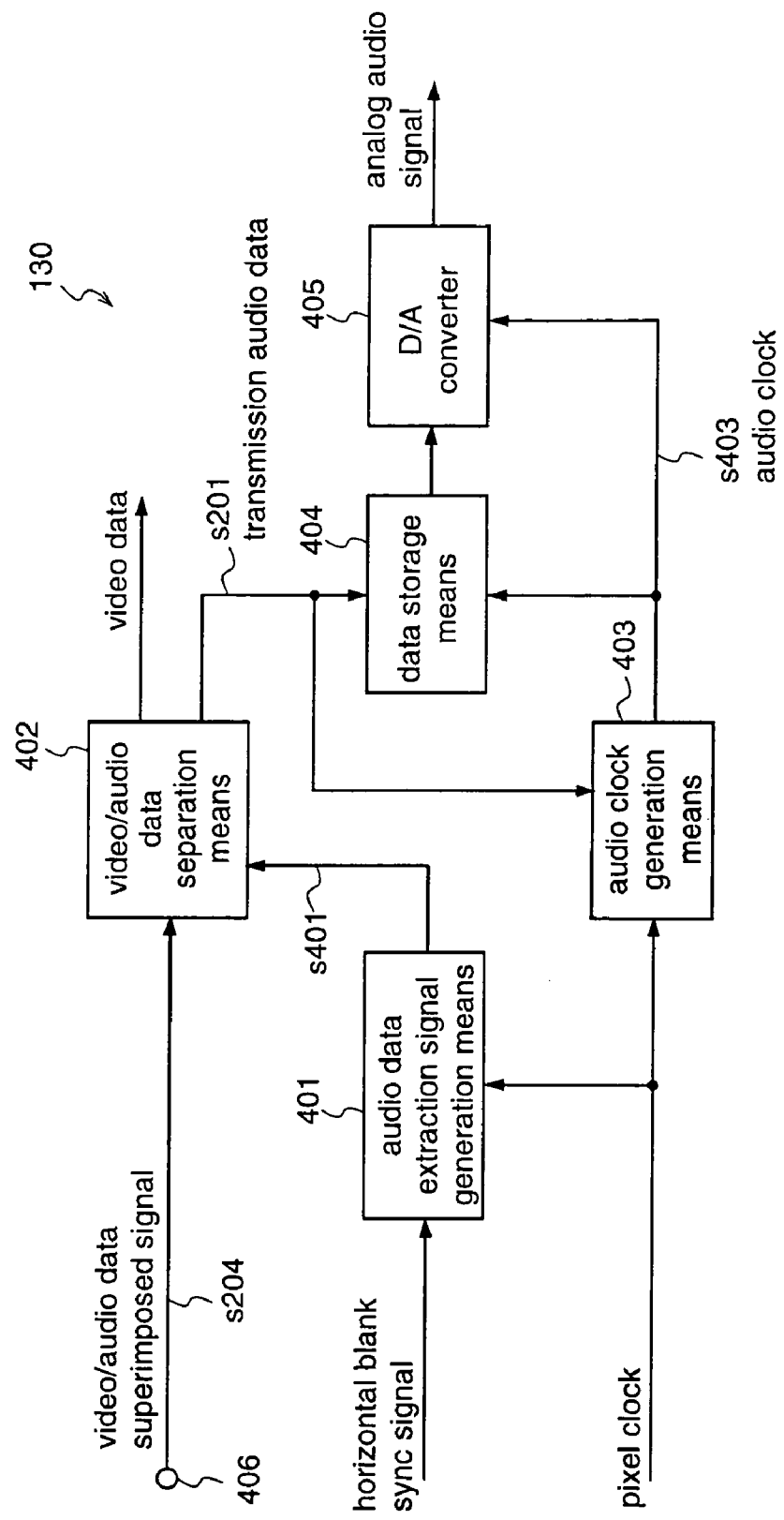
FIG. 6 is a block diagram illustrating a structure of a data receiver according to an embodiment of the present invention.
Figure 7:
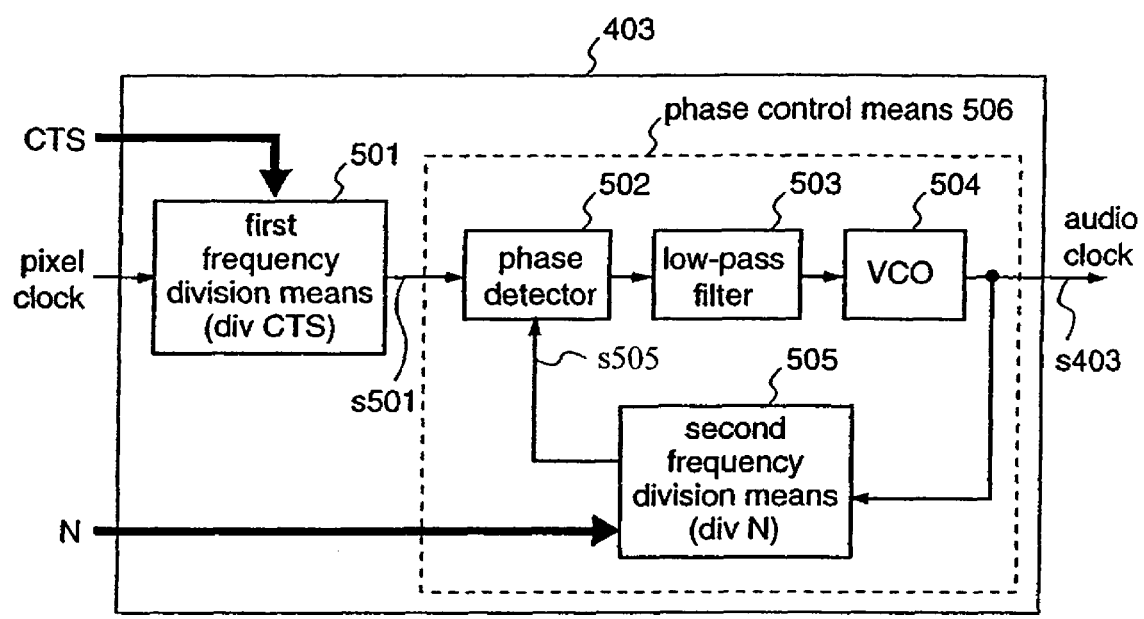
FIG. 7 is a block diagram illustrating a structure of an audio clock generation means of a data transmitter according to an embodiment of the present invention.
Figure 30:
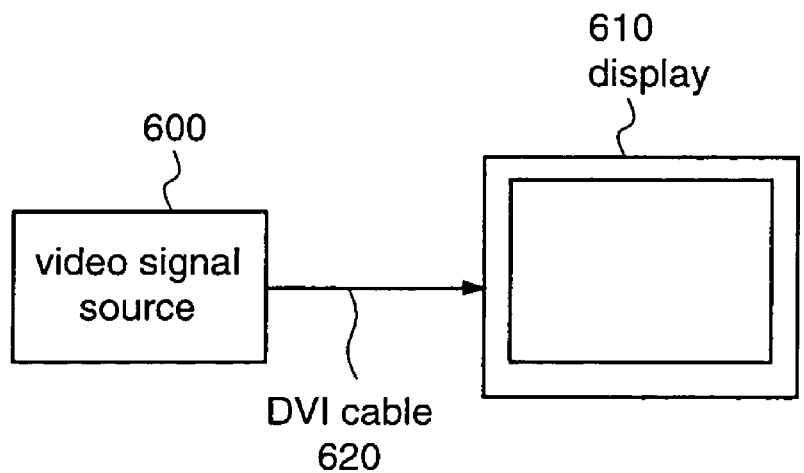
FIG. 30 is a block diagram illustrating an entire construction of a conventional system for transmitting only video data.
Figure 31:
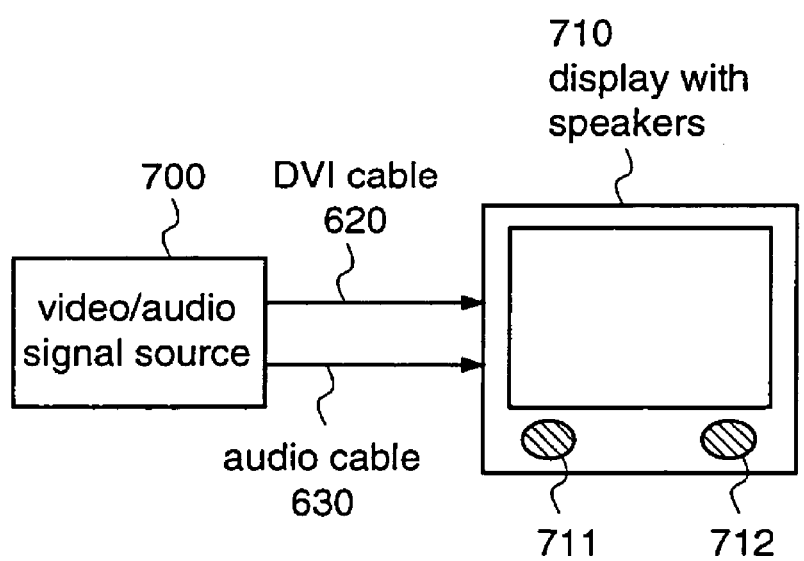
FIG. 31 is a diagram for explaining problems of the prior art.

Next, FIG. 6 is a block diagram illustrating a structure of a data receiver in the digital data transmission system according to this embodiment, and FIG. 7 is a block diagram illustrating components for generating an audio clock in an audio clock generation means of the data receiver.

In FIG. 6, numeral 401 denotes an audio data extraction signal generation means that generates an audio data extraction signal s401 using the horizontal blank sync signal and the pixel clock which are transmitted from the data transmitter 110 via the DVI cable 120, as a timing signal for extracting audio data from the video/audio data superimposed signal s204. Numeral 402 denotes a video/audio data separation means that separates the video/audio data superimposed signal s204 that is inputted through the input terminal 406, into video data and a transmission audio data s201, on the basis of the audio data extraction signal s401 that is outputted from the audio data extraction signal generation means 401 and information indicating the length of audio data, which is added to the transmission audio data s201 by the data transmitter 110. Numeral 403 denotes an audio clock generation means that performs frequency division of the pixel clock that is transmitted from the data transmitter 110 via the DVI cable 120, on the basis of the count value CTS that is added to the transmission audio data s201 by the data transmitter 110, and generates an audio clock s403 by performing phase control. Numeral 404 denotes a data storage means that stores the transmission audio data s201 that has been separated by the video/audio data separation means 402, and outputs the stored transmission audio data s201 in accordance with the audio clock s403 that is outputted from the audio clock generation means 403. Numeral 405 denotes a D/A converter that successively converts the transmission audio data s201 that is outputted from the data storage means 404 into an analog audio signal on the basis of the audio clock s403.

When the horizontal blank sync signal, the pixel clock, and the video/audio data superimposed signal s204 are inputted from the data transmitter 110 to the data receiver 130 having the above-mentioned structure via the DVI cable 120, and the horizontal blank sync signal and the pixel clock are first inputted to the audio data extraction signal generation means 401, the audio data extraction signal generation means 401 starts counting the pixel clock from when receiving the horizontal blank sync signal, and outputs the audio data extraction signal s401 to the video/audio data separation means 402 at a timing when a predetermined count of "n" has been reached.

When the audio data extraction signal s401 that has been generated by the audio data extraction signal generation means 401 is supplied to the video/audio data separation means 402, the video/audio data separation means 402 separates data corresponding to the length of the transmission audio data s201, which is described in the header of the transmission audio data s201, starting from the timing of receipt of the audio data extraction signal s401, from the video/audio data superimposed signal s204, thereby extracting the transmission audio data s201 that is located at the predetermined position in the horizontal blanking interval of the video data. The extracted transmission audio data s201 is temporarily stored in the data storage means 404.

The transmission audio data s201 that has been separated by the video/audio data separation means 402 is transmitted also to the audio clock generation means 403. The audio clock generation means 403 subjects the pixel clock to frequency division by the frequency division parameter N that has been added to the transmission audio data s201 by the data transmitter 110, thereby to generate an audio clock s403.

Components of the audio clock generation means 403 for generating the audio clock will be described with reference to FIG. 7. In FIG. 7, to simplify the figure, flows of data are not shown but only flows of clocks are shown.

The pixel clock that is inputted to the audio clock generation means 403 and the count value CTS as the additional information included in the transmission audio data s201 are inputted to a first frequency division means 501. The first frequency division means 501 subjects the pixel clock to frequency division on the basis of the count value CTS. Then, a frequency division clock s501 having a period that is "CTS"

times longer than the pixel clock, which has been obtained by the frequency division of the pixel clock on the basis of the count value CTS, is inputted to a phase control means 506, and phase-controlled in accordance with a phase comparison clock s505 that is generated by the phase control means 506, resulting in an audio clock s403.

The phase control means 506 comprises a phase detector 502 that detects a phase difference between the phase of the inputted frequency division clock s501 and the phase of the phase comparison clock s505 that is generated by a second frequency division means 505, and outputs a control signal on the basis of the phase difference; a low-pass filter 503; a VCO 504 that oscillates the audio clock s403 in accordance with the control signal that is outputted from the phase detector 502; and a second frequency division means 505 that performs frequency division of the audio clock s403 that is oscillated from the VCO 504, using the frequency division parameter N, thereby generating the phase comparison clock s505 corresponding to the transmission audio clock. The phase control means 506 generates the audio clock s403 by generating the control signal in the phase detector 502 on the basis of the phase difference between the phase of the frequency division clock s501 that is generated by the first frequency division means 501 and the phase of the phase comparison clock s505 that is outputted from the second frequency division means 505, and controlling the VCO 504 in accordance with the control signal. In FIG. 7, the frequency division parameter N and the counter value CTS are shown as being inputted to the audio clock generation means 403, while this indicates that the frequency division parameter N and the counter value CTS are inputted with being added to the above-mentioned transmission audio data s201.

Though not shown in FIG. 7, the audio clock s403 that has been generated by the audio clock generation means 403 is thereafter divided to generate a L/R clock and a bit clock. Here, the L/R clock is a sampling clock for audio data, and generally Lch data are transmitted in High sections while Rch data are transmitted in Low sections. The bit clock is synchronized with the L/R clock and used to decide audio data. When data are serially transmitted, the bit clock is utilized. Generally, the bit clock has a frequency that is 64 times or 32 times as high as the sampling frequency, and data of one bit is decided by one clock.

The data storage means 404 outputs the stored audio data s201 to the D/A converter 405, and the audio clock generation means 403 outputs the generated audio clock s403 to the D/A converter 405. The D/A converter 405 receives the digital audio data synchronized with the bit clock, from the data storage means 404, and converts the digital audio data into an analog audio signal using the three kinds of clock signals (the audio clock, the L/R clock, and the bit clock) that have been generated by the audio clock generation means 403.

As described above, the data receiver according to this embodiment receives the pixel clock and the video/audio data superimposed signal s204 from the data transmitter 110 through the DVI cable 120, and performs phase control on the basis of the phase difference between the phase of the frequency division clock s501 that is obtained by performing frequency division of the pixel clock on the basis of the count value CTS included in the transmission audio data that has been superimposed upon the signal s204, and the phase of the phase comparison clock s505 that is obtained by performing frequency division of the audio clock using the frequency division parameter N included in the transmission audio data that has been superimposed upon the signal s204, thereby generating the audio clock s403.

Hereinafter, possible values of the frequency division parameter N will be described in more detail.

The frequency division parameter N takes any value that satisfies the following formula, as is apparent from the construction of the data clock generation means 403 in the above-mentioned data receiver 130.

$$\text{Audio clock} \times CTS = \text{pixel clock} \times N \quad \text{(Formula 1)}$$

where N and CTS are integers.

When the value of the frequency division parameter N that satisfies the above Formula 1 is smaller, the frequency of the phase comparison clock s505 (=the audio clock/N) that is outputted from the second frequency division means 505 in the audio clock generation means 403 becomes higher, and the frequency of the audio clock s403 correspondingly becomes higher, whereby the time required for synchronization pull-in by the audio clock generation means 403 can be favorably reduced, while conversely the generated audio clock s403 includes more jitter, and smooth audio data of high quality cannot be obtained. On the other hand, when the value of the frequency division parameter N is larger, the frequency of the phase comparison clock s505 (=the audio clock/N) that is outputted from the second frequency division means 505 becomes lower, and correspondingly the frequency of the audio clock s403 becomes lower, whereby the synchronization pull-in time in the audio clock generation means 403 adversely gets longer, while conversely the audio clock s403 including less jitter can be generated, and smooth audio data of high quality can be generated.

Thus, in this embodiment, an additional restriction as given by the following Formula 2 is imposed on the possible values of the frequency division parameter N, in addition to the above-mentioned Formula 1.

$$300 \text{ Hz} \leq \text{audio clock}/N \leq 3000 \text{ Hz} \quad \text{(Formula 2)}$$

To be more specific, as shown by Formula 2, when the audio clock/N, i.e., the frequency of the phase comparison clock s505 is set at 300 Hz or higher, the synchronization pull-in time can be made shorter than 100 ms, resulting in an appropriate synchronization pull-in time in the audio clock generation means 403. When the mode of data is changed, i.e., the pixel clock or audio data sampling frequency of data that is transmitted from the data transmitter 110 is changed during transmission or reception of data between devices of the digital data transmission system, the audio clock generation means 403 needs to reestablish the synchronization pull-in. Also in this case, when the frequency of the phase comparison clock s505 is set at 300 Hz or higher as described above, the synchronization pull-in time can be made shorter than 100 ms. Accordingly, the time required to regenerate the audio clock after the change of the mode, and reproduce audio data on the basis of the generated audio clock can be reduced to an appropriate time.

On the other hand, when the frequency of the phase comparison clock s505 (=the audio clock/N) is set at 3000 Hz or lower as shown by Formula 2, high frequency components of clock jitter can be suppressed. Recently, 1-bit D/A converters are commonly employed as the D/A converter because of its high performance and low cost, while these 1-bit D/A converters are easily affected by jitter and require an audio clock including less jitter. In this case, when additional restriction of making the frequency of the phase comparison clock s505 lower than 3000 Hz is added to Formula 1 to suppress the clock jitter, a larger effect can be obtained in the case where the D/A converter 405 reproduces audio data.

FIGS. 8 to 26 show values of the frequency division parameter N, which satisfy the above two formulae for various pixel clocks and various audio data sampling frequencies, and the corresponding count values CTS and frequencies (kHz) of the phase comparison clocks s505, respectively.

FIGS. 8 to 26 are diagrams showing respective possible values of the frequency division parameter N, the count value CTS, and the frequency ref (Hz) of the phase comparison clock, when the pixel clock is 25.2/1.001 MHz, 25.2 MHz, 27 MHZ, 27.1×1.001 MHz, 54 MHz, 74.25/1.001 MHz, 74.25 MHz, 148.5/1.001 MHz, and 148 MHz, and the audio data sampling frequency is 32 kHz, 44.1 kHz, and 48 kHz, respectively. The frequency division parameters N shown in FIGS. 8 to 26 are values when the audio clock has a frequency that is 128 times higher than the audio data sampling frequency.

For example, FIG. 8 show the frequency division parameter N, the count value CTS, and the frequency of the phase comparison clock that satisfy the above two formulae in cases where the pixel clock is 25.2/1.001 MHz and the audio data sampling frequency is 32 kHz, 44.1 kHz, and 48 kHz, respectively.

When the 25.2/1.001 MHz pixel clock and the audio clock having the 32 kHz audio data sampling frequency (in this case, a clock having a frequency that is 128 times higher than 32 kHz) are for example inputted to the frequency division parameter decision means 301 in the audio data processing means 201 of the data transmitter 110, the frequency division parameter N can take values as shown in FIG. 8(a) (N=4576, 9152).

While FIGS. 8 to 26 show all possible values of the frequency division parameter N, the count value CTS, and the phase comparison clock frequency (Hz) for various pixel clocks and various audio data sampling frequencies, which satisfy the above two formulae, when the pixel clock is 74.25/1.001 MHz and the audio data sampling frequency is 32 kHz as shown in FIG. 23(a), there is no value that satisfies Formula 2. Therefore, when the pixel clock is 74.25/1.001 MHz and the audio data sampling frequency is 32 kHz, the phase comparison clock frequency 0.176 kHz (N=23296, CTS=421875) is doubled to get the phase comparison clock frequency 0.352 kHz (N=11648, CTS=210937~210938), thereby making the phase comparison clock frequency higher than 300 Hz. When the count value CTS is calculated according to Formula 1 for the case where the phase comparison clock frequency is 0.352 kHz (N=11648, CTS=210937~210938), 210937.5 is mathematically derived, but when the counter 303 in the audio data processing means 201 practically counts, it counts up to two count values CTS 210937 and 210938 alternately.

However, when the counter 303 alternately counts up to these two count values CTS (210937 and 210938), jitter is likely to occur in the audio clock that is generated by the data receiver 130. However, since high-quality smooth audio data are needed only in a case where the audio data sampling frequency is at least 96 kHz or 192 kHz that is utilized in a DVD or the like, no problem arises in the case of 32 kHz even when the quality of audio data is somewhat deteriorated.

As describe above, in the digital data transmission system according to this embodiment, the frequency division parameter N that is transmitted together with video data and audio data from the data transmitter 110 to the data receiver 130 can take the values shown in FIGS. 8 to 26. When the digital data transmissions system places importance on reduction of the synchronization pull-in time, it selects a frequency division parameter N that enables the phase comparison clock frequency to be closer to 3000 Hz, and sets the selected parameter N in the frequency division parameter decision means 301 of the audio data processing means 201. When clock jitter is to be suppressed to generate high-quality audio data, a frequency division parameter N that allows the phase comparison clock frequency to be closer to 300 Hz is selected, and the selected parameter is set in the frequency division parameter decision means 301.

In the above descriptions, to decide the frequency division parameter N, Formula 1 is limited by Formula 2, while Formula 1 may be limited by the following Formula 3.

$$\text{Audio clock}/N \approx 1000 \text{ Hz} \quad \text{(Formula 3)}$$

When this restriction is imposed, the above-mentioned two effects are simultaneously obtained, i.e., the pull-in time can be reduced and jitter can be suppressed, whereby high-quality audio data can be generated. Specific values of the frequency division parameter N for various pixel clock and various audio data sampling frequency of the case where the restriction of Formula 3 is imposed on Formula 1 are shown in FIGS. 27 and 28, and these values are utilized as recommendation parameters of the frequency division parameter N. FIGS. 27 and 28 are diagrams showing the count value CTS and the frequency (kHz) of the phase comparison clock in the case where the frequency division parameters N are the recommendation parameters.

When a table that gives the recommendation parameters as shown in FIGS. 27 and 28 is provided to the frequency division parameter decision means 301, the frequency division parameter N can be automatically decided on the basis of the pixel clock of video data and the sampling frequency of audio data which are inputted to the data transmitter 110, thereby simplifying the circuit design of the digital data transmission system.

In the above descriptions, the frequency division parameters N that satisfy the audio clock/N≈1000 Hz are utilized as the recommendation parameters, while when the audio data sampling frequency is 44.1 kHz, 88.2 kHz, and 176.4 kHz as shown in FIGS. 27 and 28, the frequency division parameters N that satisfy the audio clock/N≈900 Hz are employed as the recommendation parameters.

The reason is as follows. When the frequency division parameters N that satisfy the audio clock/N≈1000 Hz for example in a case where the audio data sampling frequency is 44.1 kHz are selected from FIGS. 8 to 26, values of the frequency division parameter N as the recommendation parameters vary with pixel clocks as shown in FIG. 29, while when the frequency division parameters N that satisfy the audio clock/N≈900 Hz are utilized for the recommendation parameters as described above, the frequency division parameter N is more likely to take a value N=6272 as shown in FIGS. 27 and 28, thereby obtaining commonality in the frequency division parameter N. When the frequency division parameter N has the commonality, the circuit design of the digital data transmission system is simplified, thereby reducing the device cost.

In the above descriptions, respective possible values of the frequency division parameter N in the cases where the pixel clock are 25.2/1.001 Hz, 25.2 MHz, 27 MHz, 27.1×1.001 MHz, 54 MHz, 74.25/1.001 MHz, 74.25 MHz, 148.5/1.001 MHz, and 148 MHz are specifically given, while the pixel clock other than these values may be inputted to this digital data transmission system. In such cases, the frequency division parameters that are given in Column "others" of FIGS. 27 and 28 are utilized. These values of the frequency division parameter N in Column "others" are values having a high commonality among the frequency division parameters N as the recommendation parameters which are shown for each audio data sampling frequency (for example, when the audio data sampling frequency is 32 kHz the frequency division parameter N is 4096, and when the audio data sampling frequency is 44.1 kHz the frequency division parameter N is 6272). When there values are utilized, occurrence of jitter can be suppressed and high-quality audio data can be generated even when the pixel clock other than the aforementioned clocks is inputted to the digital data transmission system. Further, the circuit design is simplified, whereby the device cost can be reduced.

As described above, according to this embodiment, the data transmitter 110 transmits, to the data receiver 130, a video/audio data superimposed signal s204 that is obtained by superimposing audio data on a horizontal blanking interval of video data in a superimposition timing that is generated using a horizontal blank sync signal and a pixel clock, together with the horizontal blank sync signal and the pixel clock, via the DVI cable 120, and then the data receiver 130 generates a timing signal that is employed for extracting audio data from the video/audio data superimposed signal s204, using the transmitted horizontal blank sync signal and pixel clock, and separates the video/audio data superimposed signal s204 into video data and audio data using the generated timing signal, and converts the digital audio data into an analog audio signal using an audio clock that is generated by dividing the pixel clock. Therefore, audio data can be transmitted easily and satisfactorily using the existing interface for transmitting video data. That is, audio data can be transmitted through the same cable as that for video data, utilizing the existing digital video data transmission system that is standardized as the DVI standard. More particularly, in this embodiment, the video data transmission processing is carried out as conventionally, while the timing signal is generated using the horizontal blank sync signal and the pixel clock, and the superimposition and separation of audio data is performed using the generated timing signal. Therefore, there is no need to change the conventional DVI system in the structure for transmitting video data, and the processing blocks for video data that are prepared for the DVI system can be used as they are both on the transmitting end and the receiving end.

Further, in this embodiment, the audio clock is generated in the data receiver 130 on the basis of the frequency division parameter N that is decided based on the pixel clock of video data and the sampling frequency of audio data which are inputted in the data transmitter 110, and the count value CTS that is obtained by counting the period of the audio clock that has been subjected to frequency division with the frequency division parameter N, with the pixel clock, and the range of the frequency division parameter N is set at 300 Hz≦audio clock/N≦3000 Hz. Therefore, the synchronization pull-in time required for the data receiver 130 to generate the audio clock s403 can be limited within 100 ms, and the high frequency components of clock jitter can be suppressed, thereby generating high-quality audio data.

In the above-mentioned embodiment, the audio clock has a frequency that is 128 times higher than the audio data sampling frequency. However, the audio clock may have a frequency that is, for example, 256 times or 384 times higher than the sampling frequency. When the audio clock is 256 times higher than the sampling frequency, the frequency division parameter N takes values that are one half the values of the frequency division parameter N shown in FIGS. 8 to 29 (i.e., N/2). When the audio clock is 386 times higher than the sampling frequency, the frequency division parameter N takes values that are one third of N (i.e., N/3).

In this embodiment, the timing signal is generated using the horizontal blank sync signal and the pixel clock, and audio data is superimposed at a predetermined position in the horizontal blanking interval of video data using the generated timing signal. However, the timing signal can be generated using a vertical blank sync signal and the pixel clock, and audio data can be superimposed at a predetermined position in a vertical blanking interval of video data using the generated timing signal.

In the above-mentioned embodiment, the data transmitter transmits digital audio data of one channel, while the present invention can apply to cases where the data transmitter transmits digital audio data of two channels, or digital data of three or more channels.

Further, in this embodiment, the data transmitter transmits packets in which audio data of the predetermined sampling rate is included, while the data transmitter can transmit packets including digital audio data that has been compressively encoded by a predetermined method (for example, AC3 method or AAC method).

In this embodiment, audio data is superimposed upon video data and the superimposed data is transmitted through the DVI standard transmission line, while other video data transmission standards may be utilized. In such case, a transmission line that implements wireless transmission as well as a transmission line that is connected with a wired cable can be employed.

INDUSTRIAL AVAILABILITY

The data transmitter and the data receiver according to the present invention are greatly useful in realizing a data transmitter and a data receiver that transmits video data and audio data that are outputted from a video/audio signal source such as a videocassette tape recorder/player, a video disk player, and a tuner, to a display unit such as a monitor receiver having a sound output function, or a television receiver, through one transmission cable, and reproduces video data and audio data easily and satisfactorily on the receiving end.

The invention claimed is:

1. A data transmitter that transmits video/audio data through a digital display connecting interface, including:
   a data processing unit for processing audio data to output transmission audio data; and
   a data superimposing unit for superimposing the transmission audio data upon video data to output video/audio data,
   said data processing unit including,
   a frequency dividing means for frequency dividing an audio clock as a reference clock for the audio data using a predetermined frequency division parameter N, to generate a transmission audio clock having a period that is N times longer than the audio clock; and
   a count means for counting the period of the transmission audio clock generated by the frequency dividing means with utilizing a pixel clock as a reference clock for the video data to output the count value CTS, and
   generating the transmission audio data by adding additional information including the frequency division parameter N and the count value CTS to the audio data, and
   said transmission audio clock being a clock having a frequency of 300 Hz or higher.

2. A data transmitter that transmits video/audio data through a digital display connecting interface, including:
   a data processing unit for processing audio data to output transmission audio data; and
   a data superimposing unit for superimposing the transmission audio data upon video data to output video/audio data, said data processing unit including,
a frequency dividing means for frequency dividing an audio clock as a reference clock for the audio data using a predetermined frequency division parameter N, to generate a transmission audio clock having a period that is N times longer than the audio clock; and
a count means for counting the period of the transmission audio clock that has been generated by the frequency dividing means with utilizing a pixel clock as a reference clock for the video data to output the count value CTS, and
generating the transmission audio data by adding additional information including the frequency division parameter N and the count value CTS to the audio data, and
said transmission audio clock being a clock having a frequency of 3000 Hz or lower.

3. A data transmitter that transmits video/audio data through a digital display connecting interface, including:
a data processing unit for processing audio data to output transmission audio data; and
a data superimposing unit for superimposing the transmission audio data upon video data to output video/audio data,
said data processing unit including,
a frequency dividing means for frequency dividing an audio clock as a reference clock for the audio data using a predetermined frequency division parameter N, to generate a transmission audio clock having a period that is N times longer than the audio clock; and
a count means for counting the period of the transmission audio clock that has been generated by the frequency dividing means with utilizing a pixel clock as a reference clock for the video data to output the count value CTS, and
generating the transmission audio data by adding additional information including the frequency division parameter N and the count value CTS to the audio data, and
said transmission audio clock being a clock having a frequency that is 300 Hz or higher, and 3000 Hz or lower.

4. The data transmitter of claim 3 wherein
when the pixel clock is 25.2/1.001 MHz and the data sampling frequency of audio data is 32 kHz, the frequency division parameter N (N is an integer) and the count value CTS is an integer.

5. The data transmitter of claim 3 wherein
when the pixel clock is 25.2/1.001 MHz and the data sampling frequency of audio data is 44.1 kHz, the frequency division parameter N (N is an integer) and the count value CTS is an integer.

6. The data transmitter of claim 3 wherein
when the pixel clock is 25.2/1.001 MHz and the data sampling frequency of audio data is 48 kHz, the frequency division parameter N (N is an integer) and the count value CTS is an integer.

7. The data transmitter of claim 3 wherein
when the pixel clock is 25.2 MHz and the data sampling frequency of audio data is 32 kHz, the frequency division parameter N (N is an integer) and the count value CTS is an integer.

8. The data transmitter of claim 3 wherein
when the pixel clock is 25.2 MHz and the data sampling frequency of audio data is 44.1 kHz, the frequency division parameter N (N is an integer) and the count value CTS is an integer.

9. The data transmitter of claim 3 wherein
when the pixel clock is 25.2 MHz and the data sampling frequency of audio data is 48 kHz, the frequency division parameter N (N is an integer) and the count value CTS is an integer.

10. The data transmitter of claim 3 wherein
when the pixel clock is 27 MHz and the data sampling frequency of audio data is 32 kHz, the frequency division parameter N (N is an integer) and the count value CTS is an integer.

11. The data transmitter of claim 3 wherein
when the pixel clock is 27 MHz and the data sampling frequency of audio data is 44.1 kHz, the frequency division parameter N (N is an integer) and the count value CTS is an integer.

12. The data transmitter of claim 3 wherein
when the pixel clock is 27 MHz and the data sampling frequency of audio data is 48 kHz, the frequency division parameter N (N is an integer) and the count value CTS is an integer.

13. The data transmitter of claim 3 wherein
when the pixel clock is 27×1.001 MHz and the data sampling frequency of audio data is 32 kHz, the frequency division parameter N (N is an integer) and the count value CTS is an integer.

14. The data transmitter of claim 3 wherein
when the pixel clock is 27×1.001 MHz and the data sampling frequency of audio data is 44.1 kHz, the frequency division parameter N (N is an integer) and the count value CTS is an integer.

15. The data transmitter of claim 3 wherein
when the pixel clock is 27×1.001 MHz and the data sampling frequency of audio data is 48 kHz, the frequency division parameter N (N is an integer) and the count value CTS is an integer.

16. The data transmitter of claim 3 wherein
when the pixel clock is 54.0 MHz and the data sampling frequency of audio data is 32 kHz, the frequency division parameter N (N is an integer) and the count value CTS is an integer.

17. The data transmitter of claim 3 wherein
when the pixel clock is 54.0 MHz and the data sampling frequency of audio data is 44.1 kHz, the frequency division parameter N (N is an integer) and the count value CTS is an integer.

18. The data transmitter of claim 3 wherein
when the pixel clock is 54.0 MHz and the data sampling frequency of audio data is 48 kHz, the frequency division parameter N (N is an integer) and the count value CTS is an integer.

19. The data transmitter of claim 3 wherein
when the pixel clock is 74.25/1.001 MHz and the data sampling frequency of audio data is 32 kHz, the relationship between the frequency division parameter N (N is an integer) and the count value CTS (CTS is an integer) is N=11648 and 210937≦CTS≦210938.

20. The data transmitter of claim 3 wherein
when the pixel clock is 74.25/1.001 MHz and the data sampling frequency of audio data is 44.1 kHz, the relationship between the frequency division parameter N (N is an integer) and the count value CTS (CTS is an integer) is N=17836 and CTS=234375.

21. The data transmitter of claim 3 wherein
when the pixel clock is 74.25/1.001 MHz and the data sampling frequency of audio data is 48 kHz, the relationship between the frequency division parameter N (N is an integer) and the count value CTS (CTS is an integer) is N=11648 and CTS=140625.

22. The data transmitter of claim 3 wherein
when the pixel clock is 74.25 MHz and the data sampling frequency of audio data is 32 kHz, the frequency division parameter N (N is an integer) and the count value CTS is an integer.

23. The data transmitter of claim 3 wherein
when the pixel clock is 74.25 MHz and the data sampling frequency of audio data is 44.1 kHz, the frequency division parameter N (N is an integer) and the count value CTS is an integer.

24. The data transmitter of claim 3 wherein
when the pixel clock is 74.25 MHz and the data sampling frequency of audio data is 48 kHz, the frequency division parameter N (N is an integer) and the count value CTS is an integer.

25. The data transmitter of claim 3 wherein
when the pixel clock is 148.5/1.001 MHz and the data sampling frequency of audio data is 32 kHz, the frequency division parameter N (N is an integer) and the count value CTS is an integer.

26. The data transmitter of claim 3 wherein
when the pixel clock is 148.5/1.001 MHz and the data sampling frequency of audio data is 44.1 kHz, the frequency division parameter N (N is an integer) and the count value CTS is an integer.

27. The data transmitter of claim 3 wherein
when the pixel clock is 148.5/1.001 MHz and the data sampling frequency of audio data is 48 kHz, the frequency division parameter N (N is an integer) and the count value CTS is an integer.

28. The data transmitter of claim 3 wherein
when the pixel clock is 148.5 MHz and the data sampling frequency of audio data is 32 kHz, the frequency division parameter N (N is an integer) and the count value CTS is an integer.

29. The data transmitter of claim 3 wherein
when the pixel clock is 148.5 MHz and the data sampling frequency of audio data is 44.1 kHz, the frequency division parameter N (N is an integer) and the count value CTS is an integer.

30. The data transmitter of claim 3 wherein
when the pixel clock is 148.5 MHz and the data sampling frequency of audio data is 48 kHz, the frequency division parameter N (N is an integer) and the count value CTS is an integer.

31. A data receiver that receives video/audio data through a digital display connecting interface, including:
a video/audio data separating unit for separating video data and transmission audio data from the video/audio data; and
an audio clock generating unit for generating an audio clock as a reference clock for audio data, on the basis of a pixel clock as a reference clock for the video data and a frequency division parameter N that has been added to the transmission audio data,
said audio clock generating unit including:
an oscillator that oscillates the audio clock in accordance with a control signal;
a frequency dividing means for frequency dividing the pixel clock using a count value CTS included in the transmission audio data to generate a frequency division clock having a period that is CTS times longer than the pixel clock; and
a phase control means for controlling the oscillator in accordance with the control signal that is generated on the basis of a difference in phase between the frequency division clock and a phase comparison clock that is obtained by dividing the audio clock by a frequency division parameter N.

32. The data receiver of claim 31 wherein
the phase control means controls the oscillator on the basis of a difference in phase between the frequency division clock that is generated by the frequency dividing means and the phase comparison clock having a frequency that is nearest to 1000 Hz.

33. The data receiver of claim 31 wherein
when the sampling frequency for the audio data is 44.1 kHz, the phase control means controls the oscillator on the basis of a difference in phase between the frequency division clock that is generated by the frequency dividing means, and the phase comparison clock having a frequency that is nearest to 900 Hz.

34. The data receiver of claim 31 wherein
when the data sampling frequency of the audio data is 32 kHz or 48 kHz, and the pixel clock has a frequency other than 25.2/1.001 MHz, 25.022 MHz, 27.000 MHz, 27.0× 1.001 MHz, 54.000 MHz, 74.25/1.001 MHz, 74.25 MHz, 148.5/1.001 MHz, and 148.5 MHz,
the frequency division parameter N (N is an integer) is decided such that the phase comparison clock that is obtained by dividing the pixel clock by the frequency division parameter N has a frequency nearest to 1000 Hz.

35. The data receiver of claim 31 wherein
when the data sampling frequency of the audio data is 44.1 kHz, and the pixel clock has a frequency other than 25.2/1.001 MHz, 25.022 MHz, 27.000 MHz, 27.0×1.001 MHz, 54.000 MHz, 74.25/1.001 MHz, 74.25 MHz, 148.5/1.001 MHz, and 148.5 MHz,
the frequency division parameter N (N is an integer) is decided such that the phase comparison clock that is obtained by dividing the pixel clock by the frequency division parameter N has a frequency that is the nearest to 900 Hz.

* * * * *